US011611062B2

(12) United States Patent
Oakes et al.

(10) Patent No.: US 11,611,062 B2
(45) Date of Patent: Mar. 21, 2023

(54) ELECTRODEPOSITABLE BATTERY ELECTRODE COATING COMPOSITIONS HAVING COATED ACTIVE PARTICLES

(71) Applicant: PPG Industries Ohio, Inc., Cleveland, OH (US)

(72) Inventors: Landon J. Oakes, Cambridge, MA (US); Stuart D. Hellring, Pittsburgh, PA (US); Haley L. Orler, Bridgeville, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 676 days.

(21) Appl. No.: 16/395,677

(22) Filed: Apr. 26, 2019

(65) Prior Publication Data

US 2020/0343526 A1  Oct. 29, 2020

(51) Int. Cl.

| | | |
|---|---|---|
| *H01M 4/04* | (2006.01) | |
| *C09D 5/44* | (2006.01) | |
| *C09D 127/12* | (2006.01) | |
| *H01M 4/131* | (2010.01) | |
| *H01M 4/62* | (2006.01) | |
| *H01G 4/008* | (2006.01) | |
| *H01M 10/052* | (2010.01) | |
| *H01M 4/02* | (2006.01) | |
| *H01M 50/20* | (2021.01) | |

(52) U.S. Cl.
CPC ........ *H01M 4/0404* (2013.01); *C09D 5/4407* (2013.01); *C09D 127/12* (2013.01); *H01M 4/131* (2013.01); *H01M 4/623* (2013.01); *H01G 4/008* (2013.01); *H01M 10/052* (2013.01); *H01M 50/20* (2021.01); *H01M 2004/027* (2013.01); *H01M 2004/028* (2013.01)

(58) Field of Classification Search
CPC .... H01M 4/0404; H01M 4/131; H01M 4/623; H01M 10/052; H01M 50/20; H01M 2004/027; H01M 2004/028; H01M 4/0421; H01M 4/045; H01M 4/0471; H01M 4/48; H01M 4/505; H01M 10/0525; H01M 4/0457; H01M 4/13; H01M 4/139; H01M 4/622; C09D 5/4407; C09D 127/12; C09D 5/448; H01G 4/008; H01G 11/06; H01G 11/28; H01G 11/38; H01G 11/46; H01G 11/50; H01G 11/86; Y02E 60/10; C25D 13/12; C25D 15/00
USPC ....................................................... 429/217
See application file for complete search history.

(56) References Cited

U.S. PATENT DOCUMENTS

| | | | |
|---|---|---|---|
| 4,514,552 A | 4/1985 | Shay et al. | |
| 4,786,565 A | 11/1988 | Shirai | |
| 5,192,592 A | 3/1993 | Shay | |
| 5,973,068 A * | 10/1999 | Yamaya | C09D 183/04 524/588 |
| 7,217,443 B2 | 5/2007 | Bobsein et al. | |
| 9,090,727 B2 | 7/2015 | Hough et al. | |
| 9,150,736 B2 | 10/2015 | Daughenbaugh et al. | |
| 9,202,638 B2 | 12/2015 | Amin-Sanayei et al. | |
| 9,228,041 B2 | 1/2016 | Martinez-Castro et al. | |
| 9,239,051 B1 | 1/2016 | Amin-Sanayei et al. | |
| 9,520,591 B2 | 12/2016 | Daughenbaugh et al. | |
| 9,882,216 B2 | 1/2018 | Sasaki | |
| 9,923,189 B2 | 3/2018 | Xiao | |
| 10,090,527 B2 | 10/2018 | Sonobe | |
| 2002/0168569 A1 | 11/2002 | Barriere et al. | |
| 2006/0042949 A1* | 3/2006 | McCollum | C09D 5/4492 204/471 |
| 2011/0160387 A1* | 6/2011 | Gam | C09D 5/4407 524/556 |
| 2013/0341194 A1 | 12/2013 | Fuchsbichler et al. | |
| 2015/0280239 A1 | 10/2015 | Hellring et al. | |
| 2016/0118664 A1 | 4/2016 | Sonobe | |
| 2016/0204439 A1 | 7/2016 | Sonobe | |
| 2016/0351973 A1 | 12/2016 | Albano et al. | |
| 2016/0380255 A1 | 12/2016 | Daughenbaugh et al. | |
| 2017/0069907 A1 | 3/2017 | Zhu et al. | |
| 2017/0352886 A1 | 12/2017 | Matsuzaki et al. | |
| 2019/0009330 A1 | 1/2019 | King et al. | |
| 2019/0088921 A1 | 3/2019 | Umehara | |
| 2020/0343526 A1* | 10/2020 | Oakes | H01M 4/505 |
| 2020/0399479 A1* | 12/2020 | Zawacky | C09D 7/62 |

FOREIGN PATENT DOCUMENTS

| | | |
|---|---|---|
| EP | 0226097 B1 | 5/1990 |
| EP | 1082394 | 3/2001 |
| EP | 1384771 A1 | 1/2004 |
| EP | 2606524 B1 | 6/2013 |
| EP | 2621005 A1 | 7/2013 |
| JP | 2011134618 A | 7/2011 |
| KR | 20130084539 A | 7/2013 |
| WO | 2014065407 A1 | 9/2016 |

OTHER PUBLICATIONS

Kimura et al., Achievement of the High-Capacity Retention Rate for the Li[Ni0.8Co0.15Al0.05]O2 (NCA) Cathode Containing an Aqueous Binder with CO2 Gas Treatment Using the Cavitation Effect (CTE), Journal of The Electrochemical Society, 166(3), A5313-A5317, (2019).

* cited by examiner

*Primary Examiner* — Gary D Harris
(74) *Attorney, Agent, or Firm* — Charles M. Yeomans

(57) ABSTRACT

The present invention is directed towards an electrodepositable coating composition comprising an electrochemically active material comprising a protective coating; an electrodepositable binder; and an aqueous medium. Also disclosed herein is a method of coating a substrate, as well as coated substrates and electrical storage devices.

35 Claims, No Drawings

US 11,611,062 B2

ELECTRODEPOSITABLE BATTERY ELECTRODE COATING COMPOSITIONS HAVING COATED ACTIVE PARTICLES

NOTICE OF GOVERNMENT SUPPORT

This invention was made with Government support under Government Contract No. DE-EE0007266 awarded by the Department of Energy. The United States Government has certain rights in this invention.

FIELD OF THE INVENTION

The present invention is directed towards electrodepositable coating compositions having coated active particles and battery electrode coatings applied by waterborne electrodeposition.

BACKGROUND INFORMATION

There is a trend in the electronics industry to produce smaller devices, powered by smaller and lighter batteries. Batteries with a negative electrode—such as a carbonaceous material, and a positive electrode—such as lithium metal oxides can provide relatively high power and low weight. Binders for producing such electrodes are usually combined with the negative electrode or positive electrode in the form of a solventborne or waterborne slurry. The solventborne slurries present safety, health and environmental dangers. Many organic solvents are toxic and flammable, volatile in nature, carcinogenic and involve special manufacturing controls to mitigate risk and reduce environmental pollution, and the waterborne slurries have oftentimes produced unsatisfactory electrodes having poor adhesion and/or poor battery performance in part due to degradation of the active materials from exposure to water. Once applied, the bound ingredients should be able to tolerate large volume expansion and contraction during charge and discharge cycles without losing interconnectivity within the electrodes. Interconnectivity of the active ingredients in an electrode is extremely important in battery performance, especially during charging and discharging cycles, as electrons must move through the electrode, and lithium ion mobility requires interconnectivity within the electrode between particles. Improved battery performance is desired, particularly without the use of carcinogenic materials and environmental pollution.

SUMMARY OF THE INVENTION

Disclosed herein is an electrodepositable coating composition comprising an electrochemically active material comprising a protective coating; an electrodepositable binder; and an aqueous medium.

Also disclosed herein is a method of coating a substrate, the method comprising electrophoretically depositing the electrodepositable coating composition comprising an electrochemically active material comprising a protective coating; an electrodepositable binder; and an aqueous medium onto a substrate.

Further disclosed herein is a coated substrate comprising an electrical current collector and a coating formed on the at least a portion of the electrical current collector, wherein the coating is deposited from the electrodepositable coating composition comprising an electrochemically active material comprising a protective coating; an electrodepositable binder; and an aqueous medium.

Still further disclosed herein is an electrical storage device comprising (a) an electrode comprising an electrical current collector and a coating formed on the at least a portion of the electrical current collector, wherein the coating is deposited from the electrodepositable coating composition comprising an electrochemically active material comprising a protective coating; an electrodepositable binder; and an aqueous medium; (b) a counter-electrode, and (c) an electrolyte.

DETAILED DESCRIPTION OF THE INVENTION

As stated above, the present invention is directed to an electrodepositable coating composition comprising, consisting essentially of, or consisting of an electrochemically active material comprising a protective coating; an electrodepositable binder; and an aqueous medium.

According to the present invention, the term "electrodepositable coating composition" refers to a composition that is capable of being deposited onto an electrically conductive substrate under the influence of an applied electrical potential.

According to the present invention, the electrodepositable coating composition comprises an electrochemically active material comprising a protective coating. As used herein, the term "protective coating" refers to a layer of material applied to the surface of another material with the intent of inhibiting or preventing damage to the underlying material from exposure to stimuli that would damage the underlying material (e.g., moisture, UV, heat, pH, etc.). In particularly, the protective coating of the present invention prevents degradation of the underlying electrochemically active material from exposure to the aqueous medium of the electrodepositable coating composition, including exposure to significant pH change of the aqueous medium that occur during the electrodeposition process. The protective coating may comprise any material that will prevent such degradation of the active material. The protective coating may comprise, for example, metal compounds or complexes such as (i) a metal chalcogen, such as a metal oxide, metal sulfide, or metal sulfate; (ii) a metal pnictogen, such as a metal nitride; (iii) a metal halide, such as a metal fluoride; (iv) a metal oxyhalide, such as a metal oxyflouride; (v) a metal oxynitride; (vi) a metal phosphate; (vi) a metal carbide; (vii) a metal oxycarbide; (viii) a metal carbonitride; (ix) olivine(s); (x) NaSICON structure(s); (xi) polymetallic ionic structure(s); (xii) metal organic structure(s) or complex(es); (xiii) polymetallic organic structure(s) or complex(es); or (xiv) a carbon-based coating such as a metal carbonate. Metals that may be used to form the metal compounds or complexes include: alkali metals; transition metals; lanthanum; silicon; tin; germanium; gallium; aluminum; and indium. The metal may also be compounded with boron and/or carbon. The protective coating may comprise, for example, non-metal compounds or complexes such as (i) a non-metal oxide; (ii) a non-metal nitride; (iii) a non-metal carbonitride; (iv) a non-metal fluoride; (v) a non-metallic organic structures or complexes; (vi) or a non-metal oxyfluoride. The protective coating may also comprise a combination of these protective materials wherein the electrochemically active material is coated with two or more different protective coating materials. The electrochemically active material comprising a protective coating may also include a mixture of electrochemically active materials coated by different protective coatings.

The protective coating material may be selected such that the protective coating is sufficiently non-porous to inhibit the direct exposure of the active material to the aqueous medium but retains lithium-ion mobility through the coating. The protective coating may comprise an at least partial coating on the surface of the electrochemically active material, such that at least 25% of the total surface of the electrochemically active material is covered by the protective coating, such as at least 40%, such as at least 50%, such as at least 60%, such as at least 75%, such as at least 85%. The electrochemically active material optionally may be fully coated with protective coating. As used herein, the electrochemically active material will be considered to be "fully coated" if the protective coating is present on the surface of the electrochemically active material in an amount of at least 95%, such as at least 99%, such as 100%. The electrochemically active material that comprises the protective coating is not particularly limited and a suitable material can be selected according to the type of electrical storage device of interest.

The electrochemically active material may comprise a material for use as an active material for a positive electrode. For example, the electrochemically active material may comprise a material capable of incorporating lithium (including incorporation through lithium intercalation/deintercalation), a material capable of lithium conversion, or combinations thereof. Non-limiting examples of electrochemically active materials capable of incorporating lithium include $LiCoO_2$, $LiNiO_2$, $LiFePO_4$, $LiCoPO_4$, $LiMnO_2$, $LiMn_2O_4$, $Li(NiMnCo)O_2$, $Li(NiCoAl)O_2$, carbon-coated $LiFePO_4$, and combinations thereof. Non-limiting examples of materials capable of lithium conversion include $LiO_2$, $FeF_2$ and $FeF_3$, aluminum, $Fe_3O_4$, and combinations thereof.

The electrochemically active material may comprise a material for use as an active material for a negative electrode. For example, the electrochemically active material may comprise graphite, lithium titanate (LTO), lithium vanadium phosphate (LVP), silicon compounds, tin, tin compounds, sulfur, sulfur compounds, or a combination thereof.

The protective coating on the electrochemically active material may comprise a metal oxide coating. The metal-oxide coating may comprise an oxide of titanium, aluminum, or combinations thereof. For example, the protective coating may comprise, consist essentially of, or consist of titanium oxide (e.g., titania (TiO2), aluminum oxide (e.g., alumina ($Al_2O_3$)), or combinations thereof. The metal-oxide coating on the electrode active material may also comprise multiple layers of metal-oxide coatings, including multiple layers of titanium oxide, aluminum oxide or combinations thereof.

The carbon-based coating on the electrochemically active material may comprise a carbonate coating, such as a carbonate salt coating. The carbonate salt may comprise a metal carbonate, such as, for example, lithium carbonate ($Li_2CO_3$), particularly if the electrochemically active material is to be used in a coating for a positive electrode. The lithium carbonate coating may be made by treating the electrochemically active material with carbon dioxide.

The protective coating may be present on the surface of the electrochemically active material in an amount sufficient to protect the underlying electrochemically active material from degradation resulting from contact with the aqueous medium during storage of the electrodepositable coating composition as well as during the electrodeposition process. The protective coating may also be present in an amount such that the protective coating does not significantly impair the performance of the resulting electrode that incorporates the coated electrode active material. Suitable thicknesses may be about 100 nm or less, such as about 0.1-50 nm, such as about 0.2-25 nm, such as about 0.5-20 nm, such as about 1-10 nm.

The protective coating may be applied to the electrochemically active material by any means known in the art. For example, the protective coating may be applied by atomic layer deposition (ALD); molecular layer deposition (MLD); chemical vapor deposition (CVD); physical vapor deposition (PVD); vacuum deposition; electron beam deposition; laser deposition; plasma deposition; radio frequency sputtering; sol-gel; microemulsion; successive ionic layer deposition; mechanofusion; solid-state diffusion; or doping. If multiple layers are present, the individual layer may each be applied by different methods or by a combination of methods of application.

It has been surprisingly discovered that the use of the electrochemically active material comprising a protective coating in the electrodepositable coating compositions of the present invention enables the production of electrodepositable coating compositions that produce coatings by electrodeposition onto substrates for use as electrodes that provide significantly improved battery performance. Without intending to be bound by any theory, it is believed that the protective coating provides protection to the underlying electrochemically active material that may otherwise be damaged by the aqueous medium of the electrodepositable coating composition, and specifically protects the electrochemically active material during the wide pH variances that occur within an electrodeposition bath during the electrodeposition process. For example, as demonstrated in the examples below, electrochemically active materials that comprise a protective coating are less susceptible to degradation during storage or during electrodeposition of the composition whereas untreated electrochemically active particles may be damaged and render the coated electrode unable to function as desired. Specifically, the degradation to the active material may render the electrochemically active material unable to function in the electrochemical cell that includes a coated electrode formed from electrodepositing an electrodepositable coating composition such that the cell retains little to no capacity during charging cycles. In contrast, the electrochemically active material comprising a protective coating are able to produce electrodes formed by electrodepositing the electrodepositable coating composition that function as intended in a cell as demonstrated by a significantly improved capacity during charging cycles.

The electrochemically active material comprising a protective coating may be present in the electrodepositable coating composition in amount of at least 45% by weight, such as at least 70% by weight, such as at least 80% by weight, such as at least 90% by weight, such as at least 91% by weight, and may be present in an amount of no more than 99% by weight, such as no more than 98% by weight, such as no more than 95% by weight, based on the total solids weight of the electrodepositable composition. The electrochemically active material comprising a protective coating may be present in the electrodepositable coating composition in amount of 45% to 99% by weight, such as 70% to 98% by weight, such as 80% to 98% by weight, such as 90% to 98% by weight, such as 91% to 98% by weight, such as 91% to 95% by weight, such as 94% to 98% by weight, such as 95% to 98% by weight, such as 96% to 98% by weight, based on the total solids weight of the electrodepositable coating composition.

The electrodepositable coating composition further comprises an electrodepositable binder. The binder serves to bind together particles of the electrodepositable coating composition, such as the electrochemically active material comprising the protective coating and other optional materials, upon electrodeposition of the coating composition onto a substrate. As used herein, the term "electrodepositable binder" refers to binders that are capable of being deposited onto a conductive substrate by the process of electrodeposition. The electrodepositable binder may comprise a film-forming polymer and may optionally further comprise a curing agent that reacts with the film-forming polymer to cure to the electrodeposited coating composition, in addition to other optional components. The electrodepositable binder is not particularly limited so long as the electrodepositable binder is capable of being deposited onto a conductive substrate by the process of electrodeposition, and a suitable binder may be selected according to the type of electrical storage device of interest.

The film-forming resin of the electrodepositable binder may comprise an ionic film-forming resin. As used herein, the term "ionic film-forming resin" refers to any film-forming resin that carries a charge, including resins that carry a negatively charged (anionic) ion and resins that carry a positively charged (cationic) ion. Suitable ionic resins include, therefore, anionic resins and cationic resins. As will be understood by those skilled in the art, anionic resins are typically employed in anionic electrodepositable coating compositions where the substrate to be coated serves as the anode in the electrodepositable bath and cationic resins are typically employed in cationic electrodepositable coating compositions where the substrate to be coated serves as the cathode in the electrodepositable bath. As described in more detail below, the ionic resin may comprise salt groups comprising the ionic groups of the resin such that the anionic or cationic resins comprise anionic salt group-containing or cationic salt group-containing resins, respectively. Non-limiting examples of resins that are suitable for use as the ionic film-forming resin in the present invention include alkyd resins, acrylics, methacrylics, polyepoxides, polyamides, polyurethanes, polyureas, polyethers, and polyesters, among others.

The ionic film-forming resin may optionally comprise active hydrogen functional groups. As used herein, the term "active hydrogen functional groups" refers to those groups that are reactive with isocyanates as determined by the Zerewitinoff test described in the JOURNAL OF THE AMERICAN CHEMICAL SOCIETY, Vol. 49, page 3181 (1927), and include, for example, hydroxyl groups, primary or secondary amino groups, carboxylic acid groups, and thiol groups.

As discussed above, the ionic resin may comprise an anionic salt group-containing resin. Suitable anionic resins include resins comprise anionic groups, such as acid groups, such as carboxylic acid groups or phosphorous acid groups, which impart a negative charge that may be at least partially neutralized with a base to form the anionic salt group-containing resin. An anionic salt group-containing resin that comprises active hydrogen functional groups may be referred to as an active hydrogen-containing, anionic salt group-containing resin.

The electrodepositable binder may comprise an ionic cellulose derivative, such as an anionic cellulose derivative. Non-limiting examples of anionic cellulose derivatives includes carboxymethylcellulose and salts thereof (CMC). CMC is a cellulosic ether in which a portion of the hydroxyl groups on the anhydroglucose rings are substituted with carboxymethyl groups. Non-limiting examples of anionic cellulose derivatives include those described in U.S. Pat. No. 9,150,736, at col. 4, line 20 through col. 5, line 3, the cited portion of which is incorporated herein by reference.

Examples of (meth)acrylic polymers are those which are prepared by polymerizing mixtures of (meth)acrylic monomers. The anionic (meth)acrylic polymer may comprise carboxylic acid moieties that are introduced into the polymer from the use of (meth)acrylic carboxylic acids. Non-limiting examples of suitable anionic (meth)acrylic polymers include those described in U.S. Pat. No. 9,870,844, at col. 3, line 37 through col. 6, line 67, the cited portion of which is incorporated herein by reference.

Non-limiting examples of other anionic resins that are suitable for use in the compositions described herein include those described in U.S. Pat. No. 9,150,736, at col. 5, lines 4-41, the cited portion of which is incorporated herein by reference.

As mentioned above, in adapting an anionic resin to be solubilized or dispersed in an aqueous medium, it is often at least partially neutralized with a base. Suitable bases include both organic and inorganic bases. Non-limiting examples of suitable bases include ammonia, monoalkylamines, dialkylamines, or trialkylamines such as ethylamine, propylamine, dimethylamine, dibutylamine and cyclohexylamine; monoalkanolamine, dialkanolamine or trialkanolamine such as ethanolamine, diethanolamine, triethanolamine, propanolamine, isopropanolamine, diisopropanolamine, dimethylethanolamine and diethylethanolamine; morpholine, e.g., N-methylmorpholine or N-ethylmorpholine. Non-limiting examples of suitable inorganic bases include the hydroxide, carbonate, bicarbonate, and acetate bases of alkali or alkaline metals, specific examples of which include potassium hydroxide, lithium hydroxide, and sodium hydroxide. The resin(s) may be at least partially neutralized from 20 to 200 percent, such as 40 to 150 percent, such as 60 to 120 percent of theoretical neutralization, based upon the total number of anionic groups present in the resin.

As discussed above, the ionic resin may comprise a cationic salt group-containing resin. Suitable cationic salt-group containing resins include resins that contain cationic groups, such as sulfonium groups and cationic amine groups, which impart a positive charge that may be at least partially neutralized with an acid to form the cationic salt group-containing resin. A cationic salt group-containing resin that comprises active hydrogen functional groups may be referred to as an active hydrogen-containing, cationic salt group-containing resin.

Non-limiting examples of cationic resins that are suitable for use in the compositions described herein include those described in U.S. Pat. No. 9,150,736, at col. 6, line 29 through col. 8, line 21, the cited portion of which is incorporated herein by reference.

As will be appreciated, in adapting the cationic resin to be solubilized or dispersed in an aqueous medium, the resin may be at least partially neutralized by, for example, treating with an acid. Non-limiting examples of suitable acids are inorganic acids, such as phosphoric acid and sulfamic acid, as well as organic acids, such as, acetic acid and lactic acid, among others. Besides acids, salts such as dimethylhydroxyethylammonium dihydrogenphosphate and ammonium dihydrogenphosphate can be used. The cationic resin may be neutralized to the extent of at least 50% or, in some cases, at least 70%, of the total theoretical neutralization equivalent of the cationic polymer based on the total number of cationic groups. The step of solubilization or dispersion may be accomplished by combining the neutralized or partially neutralized resin with the aqueous medium.

The electrodepositable binder may optionally comprise a pH-dependent rheology modifier. The pH-dependent rheology modifier may comprise a portion of or all of the film-forming polymer and/or binder. As used herein, the term "pH-dependent rheology modifier" refers to an organic compound, such as a molecule, oligomer or polymer, that has a variable rheological effect based upon the pH of the composition. The pH-dependent rheology modifier may affect the viscosity of the composition on the principle of significant volume changes of the pH-dependent rheology modifier induced by changes in the pH of the composition. For example, the pH-dependent rheology modifier may be soluble at a pH range and provide certain rheological properties and may be insoluble and coalesce at a critical pH value (and above or below based upon the type of pH-dependent rheology modifier) which causes a reduction in the viscosity of the composition due to a reduction in the volume of the rheology modifier. The relationship between the pH of the composition and viscosity due to the presence of the pH-dependent rheology modifier may be non-linear. The pH-dependent rheology modifier may comprise an alkali-swellable rheology modifier or an acid swellable rheology modifier, depending upon the type of electrodeposition that the electrodepositable coating composition is to be employed. For example, alkali-swellable rheology modifiers may be used for anionic electrodeposition, whereas acid swellable rheology modifiers may be used for cathodic electrodeposition.

The use of the pH-dependent rheology modifier in the binder of the electrodepositable coating composition in the amounts herein may allow for the production of electrodes by electrodeposition. The pH-dependent rheology modifier may comprise ionic groups and/or ionic salt groups, but such groups are not required. Without intending to be bound by any theory, it is believed that the pH dependence of the rheology modifier assists in the electrodeposition of the electrodepositable coating composition because the significant difference in pH of the electrodeposition bath at the surface of the substrate to be coated relative to the remainder of the electrodeposition bath causes the pH-dependent rheology modifier to undergo a significant reduction in volume at, or in close proximity to, the surface of the substrate to be coated inducing coalescence of the pH-dependent rheology modifier, along with the other components of the electrodepositable coating composition, on the surface of the substrate to be coated. For example, the pH at the surface of the anode in anodic electrodeposition is significantly reduced relative to the remainder of the electrodeposition bath Likewise, the pH at the surface cathode in cathodic electrodeposition is significantly higher than the rest of the electrodeposition bath. The difference in pH at the surface of the electrode to be coated during electrodeposition relative to the electrodeposition bath in a static state may be at least 6 units, such as at least 7 units, such as at least 8 units.

As used herein, the term "alkali-swellable rheology modifier" refers to a rheology modifier that increases the viscosity of a composition (i.e., thickens the composition) as the pH of the composition increases. The alkali-swellable rheology modifier may increase viscosity at a pH of about 2.5 or greater, such as about 3 or greater, such as about 3.5 or greater, such as about 4 or greater, such as about 4.5 or greater, such as about 5 or greater.

Non-limiting examples of alkali-swellable rheology modifiers include alkali-swellable emulsions (ASE), hydrophobically modified alkali-swellable emulsions (HASE), star polymers, and other materials that provide pH-triggered rheological changes at low pH, such as the pH values described herein. The alkali-swellable rheology modifiers may comprise addition polymers having constitutional units comprising the residue of ethylenically unsaturated monomers. For example, the alkali-swellable rheology modifiers may comprise addition polymers having constitutional units comprising, consisting essentially of, or consisting of the residue of: (a) 2 to 70% by weight of a monoethylenically unsaturated carboxylic acid, such as 20 to 70% by weight, such as 25 to 55% by weight, such as 35 to 55% by weight, such as 40 to 50% by weight, such as 45 to 50% by weight; (b) 20 to 80% by weight of a $C_1$ to C6 alkyl (meth)acrylate, such as 35 to 65% by weight, such as 40 to 60% by weight, such as 40 to 50% by weight, such as 45 to 50% by weight; and at least one of (c) 0 to 3% by weight of a crosslinking monomer, such as 0.1 to 3% by weight, such as 0.1 to 2% by weight; and/or (d) 0 to 60% by weight of a monoethylenically unsaturated alkyl alkoxylate monomer, such as 0.5 to 60% by weight, such as 10 to 50% by weight, the % by weight being based on the total weight of the addition polymer. The ASE rheology modifiers may comprise (a) and (b) and may optionally further comprise (c), and the HASE rheology modifiers may comprise (a), (b) and (d), and may optionally further comprise (c). When (c) is present, the pH-dependent rheology modifier may be referred to as a crosslinked pH-dependent rheology modifier. When the acid groups have a high degree of protonation (i.e., are un-neutralized) at low pH, the rheology modifier is insoluble in water and does not thicken the composition, whereas when the acid is substantially deprotonated (i.e., substantially neutralized) at higher pH values, the rheology modifier becomes soluble or dispersible (such as micelles or microgels) and thickens the composition.

The (a) monoethylenically unsaturated carboxylic acid may comprise a $C_3$ to $C_8$ monoethylenically unsaturated carboxylic acid such as acrylic acid, methacrylic acid, and the like, as well as combinations thereof.

The (b) $C_1$ to $C_8$ alkyl (meth)acrylate may comprise a $C_1$ to $C_6$ alkyl (meth)acrylate, such as a $C_1$ to $C_4$ alkyl (meth)acrylate. The $C_1$ to $C_8$ alkyl (meth)acrylate may comprise a non-substituted $C_1$ to $C_8$ alkyl (meth)acrylate such as, for example, methyl (meth)acrylate, ethyl (meth)acrylate, propyl (meth)acrylate, isopropyl (meth)acrylate, butyl (meth)acrylate, isobutyl (meth)acrylate, pentyl (meth)acrylate, isopentyl (meth)acrylate, hexyl (meth)acrylate, heptyl (meth)acrylate, isoheptyl (meth)acrylate, 2-ethylhexyl (meth)acrylate, or combinations thereof.

The (c) crosslinking monomer may comprise a polyethylenically unsaturated monomer such as ethylene glycol di(meth)acrylate, 1,6-hexanediol di(meth)acrylate, divinylbenzene, trimethylolpropane diallyl ether, tetraallyl pentaerythritol, triallyl pentaerythritol, diallyl pentaerythritol, diallyl phthalate, triallyl cyanurate, bisphenol A diallyl ether, methylene bisacrylamide, allyl sucroses, and the like, as well as combinations thereof.

The (d) monoethylenically unsaturated alkylated ethoxylate monomer may comprise a monomer having a polymerizable group, a hydrophobic group and a bivalent polyether group of a poly(alkylene oxide) chain, such as a poly(ethylene oxide) chain having about 5-150 ethylene oxide units, such as 6-10 ethylene oxide units, and optionally 0-5 propylene oxide units. The hydrophobic group is typically an alkyl group having 6-22 carbon atoms (such as a dodecyl group) or an alkaryl group having 8-22 carbon atoms (such as octyl phenol). The bivalent polyether group typically links the hydrophobic group to the polymerizable group. Examples of the bivalent polyether group linking group and hydrophobic group are a bicycloheptyl-polyether group, a bicycloheptenyl-polyether group or a branched $C_5$-$C_{50}$ alkyl-polyether group, wherein the bicycloheptyl-polyether or bicycloheptenyl-polyether group may optionally be substituted on one or more ring carbon atoms by one or two $C_1$-$C_6$ alkyl groups per carbon atom.

In addition to the monomers described above, the pH-dependent rheology modifier may comprise other ethylenically unsaturated monomers. Examples thereof include substituted alkyl (meth)acrylate monomers substituted with functional groups such as hydroxyl, amino, amide, glycidyl, thiol, and other functional groups; alkyl (meth)acrylate monomers containing fluorine; aromatic vinyl monomers; and the like. Alternatively, the pH-dependent rheology modifier may be substantially free, essentially free, or completely free of such monomers. As used herein, a pH-dependent rheology modifier is substantially free or essentially free of a monomer when constitutional units of that monomer are present, if at all, in an amount of less than 0.1% by weight or less than 0.01% by weight, respectively, based on the total weight of the pH-dependent rheology modifier.

The pH-dependent rheology modifier may be substantially free, essentially free, or completely free of amide, glycidyl or hydroxyl functional groups. As used herein, a pH-dependent rheology modifier if substantially free or essentially free of amide, glycidyl or hydroxyl functional groups if such groups are present, if at all, in an amount of less than 1% or less than 0.1% based on the total number of functional groups present in the pH-dependent rheology modifier.

The pH-dependent rheology modifier may comprise, consist essentially of, or consist of constitutional units of the residue of methacrylic acid, ethyl acrylate and a crosslinking monomer, present in the amounts described above.

The pH-dependent rheology modifier may comprise, consist essentially of, or consist of constitutional units of the residue of methacrylic acid, ethyl acrylate and a monoethylenically unsaturated alkyl alkoxylate monomer, present in the amounts described above.

The pH-dependent rheology modifier may comprise, consist essentially of, or consist of methacrylic acid, ethyl acrylate, a crosslinking monomer and a monoethylenically unsaturated alkyl alkoxylate monomer, present in the amounts described above.

Commercially available pH-dependent rheology modifiers include alkali-swellable emulsions such as ACRYSOL ASE-60, hydrophobically modified alkali-swellable emulsions such as ACRYSOL HASE TT-615, and ACRYSOL DR-180 HASE, each of which are available from the Dow Chemical Company, and star polymers, including those produced by atom transfer radical polymerization, such as fracASSIST® prototype 2 from ATRP Solutions.

Exemplary viscosity data showing the impact of the alkali-swellable rheology modifier across a range of pH values of a composition was obtained for some non-limiting examples of alkali-swellable rheology modifiers using a Brookfield viscometer operated at 20 RPMs and using a #4 spindle. The alkali-swellable rheology modifiers ACRYSOL ASE-60, ACRYSOL HASE TT-615, and ACRYSOL DR-180 HASE were characterized at 4.25% solids in a solution of deionized water. A star polymer (fracASSIST® prototype 2) was investigated at 0.81% solids due to the limited solubility of the polymer at low pH. The pH was adjusted through the addition of dimethyl ethanolamine ("DMEA"). The viscosity measurements in centipoise (cps) across the range of pH values is provided below in Table 1.

TABLE 1

| | Rheology Modifier | | | | | | | |
|---|---|---|---|---|---|---|---|---|
| | ACRYSOL ASE-60 | | ACRYSOL HASE-TT-615 | | fracASSIST® prototype 2 | | ACRYSOL DR-180 HASE | |
| | pH | Viscosity | pH | Viscosity | pH | Viscosity | pH | Viscosity |
| Property | 3.53 | 0 | 4.24 | 0 | 4.04 | 0 | 4.30 | 0 |
| | 6.31 | 2,010 | 5.90 | 454 | 6.09 | 2,274 | 6.10 | 90 |
| | 6.43 | 19,280 | 6.40 | 15,600 | 7.23 | 2,352 | 6.20 | 11,160 |
| | 6.77 | 19,130 | 7.04 | Off-scale | 7.68 | 1,914 | 7.13 | Off-scale |
| | 7.42 | 17,760 | — | — | 8.72 | 1,590 | — | — |

As shown in Table 1, a composition of water and an alkali-swellable rheology modifier at 4.25% by weight of the total composition may have an increase in viscosity of at least 500 cps over an increase in pH value of 3 pH units within the pH range of 3 to 12, such as an increase of at least 1,000 cps, such as an increase of at least 2,000 cps, such as an increase of at least 3,000 cps, such as an increase of at least 5,000 cps, such as an increase of at least 7,000 cps, such as an increase of at least 8,000 cps, such as an increase of at least 9,000 cps, such as an increase of at least 10,000 cps, such as an increase of at least 12,000 cps, such as an increase of at least 14,000 cps, or more. For example, as shown for the ACRYSOL ASE-60 alkali-swellable rheology modifier in Table 1, an increase in pH from about 3.5 to about 6.5 results in an increase in the viscosity of the composition of about 19,000 cps. A composition of water and an alkali-swellable rheology modifier at 4.25% by weight of the total composition may result in a corresponding decrease in the viscosity of the composition over a corresponding decrease in pH value.

As shown in Table 1, a 4.25% by weight solution of the alkali-swellable rheology modifier, the % by weight based on the total weight of the solution, may have a viscosity increase of at least 1,000 cps when measured from about pH 4 to about pH 7, such as at least 1,500 cps, such as at least 1,900 cps, such as at least 5,000 cps, such as at least 10,000 cps, such as at least 15,000 cps, such as at least 17,000 cps, as measured using a Brookfield viscometer using a #4 spindle and operated at 20 RPMs. A composition of water and an alkali-swellable rheology modifier at 4.25% by weight of the total composition may result in a corresponding decrease in the viscosity of the composition over a corresponding decrease in pH value.

As shown in Table 1, a 4.25% by weight solution of the alkali-swellable rheology modifier, the % by weight based on the total weight of the solution, may have a viscosity increase of at least 1,000 cps when measured from about pH 4 to about pH 6.5, such as at least 1,500 cps, such as at least 1,900 cps, such as at least 5,000 cps, such as at least 10,000 cps, such as at least 15,000 cps, such as at least 17,000 cps, as measured using a Brookfield viscometer using a #4 spindle and operated at 20 RPMs. A composition of water and an alkali-swellable rheology modifier at 4.25% by weight of the total composition may result in a corresponding decrease in the viscosity of the composition over a corresponding decrease in pH value.

As shown in Table 1, a composition of water and an alkali-swellable rheology modifier of an star polymer at 0.81% by weight of the total composition may have a viscosity increase of at least 400 cps when measured from about pH 4 to about pH 6.5, such as at least 600 cps, such as at least 800 cps, such as at least 1,000 cps, such as at least 1,200 cps, such as at least 1,400 cps, such as at least 2,000 cps, such as at least 2,200 cps, as measured using a Brookfield viscometer using a #4 spindle and operated at 20 RPMs.

As used herein, the term "star polymer" refers to branched polymers with a general structure consisting of several (three or more) linear chains connected to a central core. The core of the polymer can be an atom, molecule, or macromolecule; the chains, or "arms", may include variable-length organic chains. Star-shaped polymers in which the arms are all equivalent in length and structure are considered homogeneous, and ones with variable lengths and structures are considered heterogeneous. The star polymer may comprise any functional groups that enable the star polymer to provide pH-dependent rheology modification.

As used herein, the term "acid-swellable rheology modifier" refers to a rheology modifier that is insoluble at high pH and does not thicken the composition and is soluble at lower pH and thickens the composition. The acid-swellable rheology modifier may increase viscosity at a pH of about 4 or less, such as about 4.5 or less, such as about 5 or less, such as about 6 or less.

The pH-dependent rheology modifier may be present in the electrodepositable coating composition in an amount of at least 10% by weight, such as at least 20% by weight, such as at least 30% by weight, such as at least 40%, such as at least 50%, such as at least 60%, such as at least 70%, such as at least 75%, such as at least 80%, such as at least 85%, such as at least 90%, such as at least 93%, such as at least 95%, such as at 100%, and may be present in an amount of no more than 100% by weight, such as no more than 99% by weight, such as no more than 95% by weight, such as no more than 93% by weight, based on the total solids weight of the binder solids. The pH-dependent rheology modifier may be present in the electrodepositable coating composition in an amount of 10% to 100% by weight, such as 20% to 100% by weight, such as 30% to 100% by weight, 40% to 100% by weight, 50% to 100% by weight, 60% to 100% by weight, 70% to 100% by weight, 75% to 100% by weight, 80% to 100% by weight, 85% to 100% by weight, 90% to 100% by weight, 93% to 100% by weight, 95% to 100% by weight, such as 50% to 99% by weight, such as 75% to 95% by weight, such as 87% to 93% by weight, 10% to 50% by weight, such as 10% to 30% by weight, such as 10% to 20% by weight, based on the total solids weight of the binder solids.

The pH-dependent rheology modifier may be present in the electrodepositable coating composition in an amount of at least 0.1% by weight, such as at least 0.2% by weight, such as at least 0.3% by weight, such as at least 1% by weight, such as at least 1.5% by weight, such as at least 2% by weight, and may be present in an amount of no more than 10% by weight, such as no more than 5% by weight, such as no more than 4.5% by weight, such as no more than 4% by weight, such as no more than 3% by weight, such as no more than 2% by weight, such as no more than 1% by weight, based on the total solids weight of the electrodepositable coating composition. The pH-dependent rheology modifier may be present in the electrodepositable coating composition in an amount of 0.1% to 10% by weight, such as 0.2% to 10% by weight, such as 0.3 to 10% by weight, such as 1% to 7% by weight, such as 1.5% to 5% by weight, such as 2% to 4.5% by weight, such as 3% to 4% by weight, such as 0.1% to 0.4% by weight, such as 0.1% to 1% by weight, based on the total solids weight of the electrodepositable coating composition.

According to the present invention, the electrodepositable binder may optionally further comprise a fluoropolymer. The fluoropolymer may comprise a portion of the electrodepositable binder of the electrodepositable coating composition. The fluoropolymer may be present in the electrodepositable coating composition in the form of micelles.

The fluoropolymer may comprise a (co)polymer comprising the residue of vinylidene fluoride. A non-limiting example of a (co)polymer comprising the residue of vinylidene fluoride is a polyvinylidene fluoride polymer (PVDF). As used herein, the "polyvinylidene fluoride polymer" includes homopolymers, copolymers, such as binary copolymers, and terpolymers, including high molecular weight homopolymers, copolymers, and terpolymers. Such (co)polymers include those containing at least 50 mole percent, such as at least 75 mole %, and at least 80 mole %, and at least 85 mole % of the residue of vinylidene fluoride (also known as vinylidene difluoride). The vinylidene fluoride monomer may be copolymerized with at least one comonomer selected from the group consisting of tetrafluoroethylene, trifluoroethylene, chlorotrifluoroethylene, hexafluoropropene, vinyl fluoride, pentafluoropropene, tetrafluoropropene, perfluoromethyl vinyl ether, perfluoropropyl vinyl ether and any other monomer that would readily copolymerize with vinylidene fluoride in order to produce the fluoropolymer of the present invention. The fluoropolymer may also comprise a PVDF homopolymer.

The fluoropolymer may comprise a high molecular weight PVDF having a weight average molecular weight of at least 50,000 g/mol, such as at least 100,000 g/mol, and may range from 50,000 g/mol to 1,500,000 g/mol, such as 100,000 g/mol to 1,000,000 g/mol. PVDF is commercially available, e.g., from Arkema under the trademark KYNAR, from Solvay under the trademark HYLAR, and from Inner Mongolia 3F Wanhao Fluorochemical Co., Ltd.

The fluoropolymer may comprise a (co)polymer comprising the residue of tetrafluoroethylene. The fluoropolymer may also comprise a polytetrafluoroethylene (PTFE) homopolymer.

The fluoropolymer may comprise a nanoparticle. As used herein, the term "nanoparticle" refers to particles having a particle size of less than 1,000 nm. The fluoropolymer may have a particle size of at least 50 nm, such as at least 100 nm, such as at least 250 nm, such as at least 300 nm, and may be no more than 999 nm, such as no more than 600 nm, such as no more than 450 nm, such as no more than 400 nm, such as no more than 300 nm, such as no more than 200 nm. The fluoropolymer nanoparticles may have a particle size of 50 nm to 999 nm, such as 100 nm to 800 nm, such as 100 nm to 600 nm, such as 250 nm to 450 nm, such as 300 nm to 400 nm, such as 100nm to 400 nm, such as 100 nm to 300 nm, such as 100 nm to 200 nm. Although the fluoropolymer may comprise a nanoparticle, larger particles and combinations of nanoparticles and larger particles may also be used. As used herein, the term "particle size" refers to average diameter of the fluoropolymer particles. The particle size referred to in the present disclosure was determined by the following procedure: A sample was prepared by dispersing the fluoropolymer onto a segment of carbon tape that was attached to an aluminum scanning electron microscope (SEM) stub. Excess particles were blown off the carbon tape with compressed air. The sample was then sputter coated with Au/Pd for 20 seconds and was then analyzed in a Quanta 250 FEG SEM (field emission gun scanning electron microscope) under high vacuum. The accelerating voltage was set to 20.00 kV and the spot size was set to 3.0. Images were collected from three different areas on the prepared sample, and ImageJ software was used to measure the diameter of 10 fluoropolymer particles from each area for a total of 30 particle size measurements that were averaged together to determine the average particle size.

The fluoropolymer may be present in the electrodepositable binder in an amount of at least 15% by weight, such as at least 30% by weight, such as at least 40% by weight, such as at least 50% by weight, such as at least 70% by weight, such as at least 80% by weight, and may be present in an amount of no more than 99% by weight, such as no more than 96% by weight, such as no more than 95% by weight, such as no more than 90% by weight, such as no more than 80%, such as no more than 70%, such as no more than 60%, based on the total weight of the binder solids. The fluoropolymer may be present in in the electrodepositable binder in amounts of 15% to 99% by weight, such as 30% to 96% by weight, such as 40% to 95% by weight, such as 50% to 90% by weight, such as 70% to 90% by weight, such as 80% to 90% by weight, such as 50% to 80% by weight, such as 50% to 70% by weight, such as 50% to 60% by weight, such as 55% to 65% by weight, based on the total weight of the binder solids.

The fluoropolymer may be present in the electrodepositable coating composition in an amount of at least 0.1% by weight, such as at least 1% by weight, such as at least 1.3% by weight, such as at least 1.9% by weight, and may be present in an amount of no more than 10% by weight, such as no more than 6% by weight, such as no more than 4.5% by weight, such as no more than 2.9% by weight, based on the total solids weight of the electrodepositable composition. The fluoropolymer may be present in the electrodepositable coating composition in an amount of 0.1% to 10% by weight, such as 1% to 6% by weight, such as 1.3% to 4.5% by weight, such as 1.9% to 2.9% by weight, based on the total solids weight of the electrodepositable coating composition.

The fluoropolymer to pH-dependent rheology modifier weight ratio may be at least 1:20, such as at least 1:2, such as at least 1:1, such as at least 3:1, such as at least 4:1, such as at least 6:1, such as at least 10:1, such as at least 15:1, such as at least 19:1, and may be no more than 20:1, such as no more than 15:1, such as no more than 10:1, such as no more than 6:1, such as no more than 4:1, such as no more than 3:1, such as no more than 1:1, such as no more than 1:2, such as no more than 1:3. The fluoropolymer to pH-dependent rheology modifier weight ratio may be from 1:20 to 20:1, such as 1:2 to 15:1, such as 1:1 to 10:1, such as 3:1 to 6:1.

Alternatively, the electrodepositable coating composition may be substantially free, essentially free, or completely free of fluoropolymer. As used herein, the electrodepositable coating composition is substantially free or essentially free of fluoropolymer when fluoropolymer is present, if at all, in an amount of less than 5% by weight or less than 0.2% by weight, respectively, based on the total weight of the binder solids.

The electrodepositable binder may optionally further comprise a dispersant. The dispersant may assist in dispersing the fluoropolymer, the electrochemically active material, and/or, as described further below, the electrically conductive agent (if present) in the aqueous medium. The dispersant may comprise at least one phase that is compatible with the fluoropolymer and/or other components of the electrodepositable coating composition, such as the electrochemically active material comprising a protective coating or, if present, the electrically conductive agent and may further comprise at least one phase that is compatible with the aqueous medium. The electrodepositable coating composition may comprise one, two, three, four or more different dispersants, and each dispersant may assist in dispersing a different component of the electrodepositable coating composition. The dispersant may comprise any material having phases compatible with both a component of the solids (e.g., the electrodepositable binder, such as the fluoropolymer (if present), the electrochemically active material comprising a protective coating, and/or the electrically conductive agent) and the aqueous medium. As used herein, the term "compatible" means the ability of a material to form a blend with other materials that is and will remain substantially homogenous over time. For example, the dispersant may comprise a polymer comprising such phases. The dispersant and the fluoropolymer, if present, may not be bound by a covalent bond. The dispersant may be present in the electrodepositable coating composition in the form of a micelle. The dispersant may be in the form of a block polymer, a random polymer, or a gradient polymer, wherein the different phases of the dispersant are present in the different blocks of the polymer, are randomly included throughout the polymer, or are progressively more or less densely present along the polymer backbone, respectively. The dispersant may comprise any suitable polymer to serve this purpose. For example, the polymer may comprise addition polymers produced by polymerizing ethylenically unsaturated monomers, polyepoxide polymers, polyamide polymers, polyurethane polymers, polyurea polymers, polyether polymers, polyacid polymers, and/or polyester polymers, among others. The dispersant may also serve as an additional component of the binder of the electrodepositable coating composition.

The dispersant may comprise functional groups. The functional groups may comprise, for example, active hydrogen functional groups, heterocyclic groups, and combinations thereof. As used herein, the term "heterocyclic group" refers to a cyclic group containing at least two different elements in its ring such as a cyclic moiety having at least one atom in addition to carbon in the ring structure, such as, for example, oxygen, nitrogen or sulfur. Non-limiting examples of heterocylic groups include epoxides, lactams and lactones. In addition, when epoxide functional groups are present on the addition polymer, the epoxide functional groups on the dispersant may be post-reacted with a beta-hydroxy functional acid. Non-limiting examples of beta-hydroxy functional acids include citric acid, tartaric acid, and/or an aromatic acid, such as 3-hydroxy-2-naphthoic acid. The ring opening reaction of the epoxide functional group will yield hydroxyl functional groups on the dispersant.

When acid functional groups are present, the dispersant may have a theoretical acid equivalent weight of at least 350 g/acid equivalent, such as at least 878 g/acid equivalent, such as at least 1,757 g/acid equivalent, and may be no more than 17,570 g/acid equivalent, such as no more than 12,000 g/acid equivalent, such as no more than 7,000 g/acid equivalent. The dispersant may have a theoretical acid equivalent weight of 350 to 17,570 g/acid equivalent, such as 878 to 12,000 g/acid equivalent, such as 1,757 to 7,000 g/acid equivalent.

As mentioned above, the dispersant may comprise an addition polymer. The addition polymer may be derived from, and comprise constitutional units comprising the residue of, one or more alpha, beta-ethylenically unsaturated monomers, such as those discussed below, and may be prepared by polymerizing a reaction mixture of such monomers. The mixture of monomers may comprise one or more active hydrogen group-containing ethylenically unsaturated monomers. The reaction mixture may also comprise ethylenically unsaturated monomers comprising a heterocyclic group. As used herein, an ethylenically unsaturated monomer comprising a heterocyclic group refers to a monomer having at least one alpha, beta ethylenic unsaturated group and at least cyclic moiety having at least one atom in addition to carbon in the ring structure, such as, for example, oxygen, nitrogen or sulfur. Non-limiting examples of ethylenically unsaturated monomers comprising a heterocyclic group include epoxy functional ethylenically unsaturated monomers, vinyl pyrrolidone and vinyl caprolactam, among others. The reaction mixture may additionally comprise other ethylenically unsaturated monomers such as alkyl esters of (meth)acrylic acid and others described below.

The addition polymer may comprise a (meth)acrylic polymer that comprises constitutional units comprising the residue of one or more (meth)acrylic monomers. The (meth)acrylic polymer may be prepared by polymerizing a reaction mixture of alpha, beta-ethylenically unsaturated monomers that comprise one or more (meth)acrylic monomers and optionally other ethylenically unsaturated monomers. As used herein, the term "(meth)acrylic monomer" refers to acrylic acid, methacrylic acid, and monomers derived therefrom, including alkyl esters of acrylic acid and methacrylic acid, and the like. As used herein, the term "(meth)acrylic polymer" refers to a polymer derived from or comprising constitutional units comprising the residue of one or more (meth)acrylic monomers. The mixture of monomers may comprise one or more active hydrogen group-containing (meth)acrylic monomers, ethylenically unsaturated monomers comprising a heterocyclic group, and other ethylenically unsaturated monomers. The (meth)acrylic polymer may also be prepared with an epoxy functional ethylenically unsaturated monomer such as glycidyl methacrylate in the reaction mixture, and epoxy functional groups on the resulting polymer may be post-reacted with a beta-hydroxy functional acid such as citric acid, tartaric acid, and/or 3-hydroxy-2-naphthoic acid to yield hydroxyl functional groups on the (meth)acrylic polymer.

The addition polymer may comprise constitutional units comprising the residue of an alpha, beta-ethylenically unsaturated carboxylic acid. Non-limiting examples of alpha, beta-ethylenically unsaturated carboxylic acids include those containing up to 10 carbon atoms such as acrylic acid and methacrylic acid. Non-limiting examples of other unsaturated acids are alpha, beta-ethylenically unsaturated dicarboxylic acids such as maleic acid or its anhydride, fumaric acid and itaconic acid. Also, the half esters of these dicarboxylic acids may be employed. The constitutional units comprising the residue of the alpha, beta-ethylenically unsaturated carboxylic acids may comprise at least 1% by weight, such as at least 2% by weight, such as at least 5% by weight, and may be no more than 50% by weight, such as no more than 20% by weight, such as no more than 10% by weight, such as no more than 5% by weight, based on the total weight of the addition polymer. The constitutional units comprising the residue of the alpha, beta-ethylenically unsaturated carboxylic acids may comprise 1% to 50% by weight, 2% to 50% by weight, such as 2% to 20% by weight, such as 2% to 15% by weight, such as 2% to 10% by weight, such as 2% to 5% by weight, such as 1% to 5% by weight, based on the total weight of the addition polymer. The addition polymer may be derived from a reaction mixture comprising the alpha, beta-ethylenically unsaturated carboxylic acids in an amount of 1% to 50% by weight, 2% to 50% by weight, such as 2% to 20% by weight, such as 2% to 10% by weight, such as 2% to 5% by weight, such as 1% to 5% by weight, based on the total weight of polymerizable monomers used in the reaction mixture. The inclusion of constitutional units comprising the residue of an alpha, beta-ethylenically unsaturated carboxylic acids in the dispersant results in a dispersant comprising at least one carboxylic acid group which may assist in providing stability to the dispersion.

The addition polymer may comprise constitutional units comprising the residue of an alkyl esters of (meth)acrylic acid containing from 1 to 3 carbon atoms in the alkyl group. Non-limiting examples of alkyl esters of (meth)acrylic acid containing from 1 to 3 carbon atoms in the alkyl group include methyl (meth)acrylate and ethyl (meth)acrylate. The constitutional units comprising the residue of the alkyl esters of (meth)acrylic acid containing from 1 to 3 carbon atoms in the alkyl group may comprise at least 20% by weight, such as at least 30% by weight, such as at least 40% by weight, such as at least 45% by weight, such as at least 50% by weight, and may be no more than 98% by weight, such as no more than 96% by weight, such as no more than 90% by weight, such as no more than 80% by weight, such as no more than 75% by weight, based on the total weight of the addition polymer. The constitutional units comprising the residue of the alkyl esters of (meth)acrylic acid containing from 1 to 3 carbon atoms in the alkyl group may comprise 20% to 98% by weight, such as 30% to 96% by weight, such as 30% to 90% by weight, 40% to 90% by weight, such as 40% to 80% by weight, such as 45% to 75% by weight, based on the total weight of the addition polymer. The addition polymer may be derived from a reaction mixture comprising the alkyl esters of (meth)acrylic acid containing from 1 to 3 carbon atoms in the alkyl group in an amount of 20% to 98% by weight, such as 30% to 96% by weight, such as 30% to 90% by weight, 40% to 90% by weight, such as 40% to 80% by weight, such as 45% to 75% by weight, based on the total weight of polymerizable monomers used in the reaction mixture.

The addition polymer may comprise constitutional units comprising the residue of an alkyl esters of (meth)acrylic acid containing from 4 to 18 carbon atoms in the alkyl group. Non-limiting examples of alkyl esters of (meth)acrylic acid containing from 4 to 18 carbon atoms in the alkyl group include butyl (meth)acrylate, hexyl (meth)acrylate, octyl (meth)acrylate, isodecyl (meth)acrylate, stearyl (meth)acrylate, 2-ethylhexyl (meth)acrylate, decyl (meth)acrylate and dodecyl (meth)acrylate. The constitutional units comprising the residue of the alkyl esters of (meth)acrylic acid containing from 4 to 18 carbon atoms in the alkyl group may comprise at least 2% by weight, such as at least 5% by weight, such as at least 10% by weight, such as at least 15% by weight, such as at least 20% by weight, and may be no more than 70% by weight, such as no more than 60% by weight, such as no more than 50% by weight, such as no more than 40% by weight, such as no more than 35% by weight, based on the total weight of the addition polymer. The constitutional units comprising the residue of the alkyl esters of (meth)acrylic acid containing from 4 to 18 carbon atoms in the alkyl group may comprise 2% to 70% by weight, such as 2% to 60% by weight, such as 5% to 50% by weight, 10% to 40% by weight, such as 15% to 35% by weight, based on the total weight of the addition polymer. The addition polymer may be derived from a reaction mixture comprising the alkyl esters of (meth)acrylic acid containing from 4 to 18 carbon atoms in the alkyl group in an amount of 2% to 70% by weight, such as 2% to 60% by weight, such as 5% to 50% by weight, 10% to 40% by weight, such as 15% to 35% by weight, based on the total weight of polymerizable monomers used in the reaction mixture.

The addition polymer may comprise constitutional units comprising the residue of a hydroxyalkyl ester. Non-limiting examples of hydroxyalkyl esters include hydroxyethyl (meth)acrylate and hydroxypropyl (meth)acrylate. The constitutional units comprising the residue of the hydroxyalkyl ester may comprise at least 0.5% by weight, such as at least 1% by weight, such as at least 2% by weight, and may be no more than 30% by weight, such as no more than 20% by weight, such as no more than 10% by weight, such as no more than 5% by weight, based on the total weight of the addition polymer. The constitutional units comprising the residue of the hydroxyalkyl ester may comprise 0.5% to 30% by weight, such as 1% to 20% by weight, such as 2% to 20% by weight, 2% to 10% by weight, such as 2% to 5% by weight, based on the total weight of the addition polymer. The addition polymer may be derived from a reaction mixture comprising the hydroxyalkyl ester in an amount of 0.5% to 30% by weight, such as 1% to 20% by weight, such as 2% to 20% by weight, 2% to 10% by weight, such as 2% to 5% by weight, based on the total weight of polymerizable monomers used in the reaction mixture. The inclusion of constitutional units comprising the residue of a hydroxyalkyl ester in the dispersant results in a dispersant comprising at least one hydroxyl group (although hydroxyl groups may be included by other methods). Hydroxyl groups resulting from inclusion of the hydroxyalkyl esters (or incorporated by other means) may react with a separately added crosslinking agent that comprises functional groups reactive with hydroxyl groups such as, for example, an aminoplast, phenolplast, polyepoxides and blocked polyisocyanates, or with N-alkoxymethyl amide groups or blocked isocyanato groups present in the addition polymer when self-crosslinking monomers that have groups that are reactive with the hydroxyl groups are incorporated into the addition polymer.

The addition polymer may comprise constitutional units comprising the residue of an ethylenically unsaturated monomer comprising a heterocyclic group. Non-limiting examples of ethylenically unsaturated monomers comprising a heterocyclic group include epoxy functional ethylenically unsaturated monomers, such as glycidyl (meth)acrylate, vinyl pyrrolidone and vinyl caprolactam, among others. The constitutional units comprising the residue of the ethylenically unsaturated monomers comprising a heterocyclic group may comprise at least 0.5% by weight, such as at least 1% by weight, such as at least 5% by weight, such as at least 8% by weight, and may be no more than 99% by weight, such as no more than 50% by weight, such as no more than 40% by weight, such as no more than 30% by weight, such as no more than 27% by weight, based on the total weight of the addition polymer. The constitutional units comprising the residue of the ethylenically unsaturated monomers comprising a heterocyclic group may comprise 0.5% to 99% by weight, such as 0.5% to 50% by weight, such as 1% to 40% by weight, such as 5% to 30% by weight, 8% to 27% by weight, based on the total weight of the addition polymer. The addition polymer may be derived from a reaction mixture comprising the ethylenically unsaturated monomers comprising a heterocyclic group in an amount of 0.5% to 50% by weight, such as 1% to 40% by weight, such as 5% to 30% by weight, 8% to 27% by weight, based on the total weight of polymerizable monomers used in the reaction mixture.

As noted above, the addition polymer may comprise constitutional units comprising the residue of a self-crosslinking monomer, and the addition polymer may comprise a self-crosslinking addition polymer. As used herein, the term "self-crosslinking monomer" refers to monomers that incorporate functional groups that may react with other functional groups present on the dispersant to form a crosslink between the dispersant or more than one dispersant. Non-limiting examples of self-crosslinking monomers include N-alkoxymethyl (meth)acrylamide monomers such as N-butoxymethyl (meth)acrylamide and N-isopropoxymethyl (meth)acrylamide, as well as self-crosslinking monomers containing blocked isocyanate groups, such as isocyanatoethyl (meth)acrylate in which the isocyanato group is reacted ("blocked") with a compound that unblocks at curing temperature. Examples of suitable blocking agents include epsilon-caprolactone and methylethyl ketoxime. The constitutional units comprising the residue of the self-crosslinking monomer may comprise at least 0.5% by weight, such as at least 1% by weight, such as at least 2% by weight, and may be no more than 30% by weight, such as no more than 20% by weight, such as no more than 10% by weight, such as no more than 5% by weight, based on the total weight of the addition polymer. The constitutional units comprising the residue of the self-crosslinking monomer may comprise 0.5% to 30% by weight, such as 1% to 20% by weight, such as 2% to 20% by weight, 2% to 10% by weight, such as 2% to 5% by weight, based on the total weight of the addition polymer. The addition polymer may be derived from a reaction mixture comprising the self-crosslinking monomer in an amount of 0.5% to 30% by weight, such as 1% to 20% by weight, such as 2% to 20% by weight, 2% to 10% by weight, such as 2% to 5% by weight, based on the total weight of polymerizable monomers used in the reaction mixture.

The addition polymer may comprise constitutional units comprising the residue of other alpha, beta-ethylenically unsaturated monomers. Non-limiting examples of other alpha, beta-ethylenically unsaturated monomers include vinyl aromatic compounds such as styrene, alpha-methyl styrene, alpha-chlorostyrene and vinyl toluene; organic nitriles such as acrylonitrile and methacrylonitrile; allyl monomers such as allyl chloride and allyl cyanide; monomeric dienes such as 1,3-butadiene and 2-methyl-1,3-butadiene; and acetoacetoxyalkyl (meth)acrylates such as acetoacetoxyethyl methacrylate (AAEM) (which may be self-crosslinking). The constitutional units comprising the residue of the other alpha, beta-ethylenically unsaturated monomers may comprise at least 0.5% by weight, such as at least 1% by weight, such as at least 2% by weight, and may be no more than 30% by weight, such as no more than 20% by weight, such as no more than 10% by weight, such as no more than 5% by weight, based on the total weight of the addition polymer. The constitutional units comprising the residue of the other alpha, beta-ethylenically unsaturated monomers may comprise 0.5% to 30% by weight, such as 1% to 20% by weight, such as 2% to 20% by weight, 2% to 10% by weight, such as 2% to 5% by weight, based on the total weight of the addition polymer. The addition polymer may be derived from a reaction mixture comprising the other alpha, beta-ethylenically unsaturated monomers in an amount of 0.5% to 30% by weight, such as 1% to 20% by weight, such as 2% to 20% by weight, 2% to 10% by weight, such as 2% to 5% by weight, based on the total weight of polymerizable monomers used in the reaction mixture.

The monomers and relative amounts may be selected such that the resulting addition polymer has a Tg of 100° C. or less, typically from −50° C. to +70° C., such as −50° C. to 0° C. A lower Tg that is below 0° C. may be desirable to ensure acceptable battery performance at low temperature.

The addition polymers may be prepared by conventional free radical initiated solution polymerization techniques in which the polymerizable monomers are dissolved in a solvent or a mixture of solvents and polymerized in the presence of a free radical initiator until conversion is complete. The solvent used to produce the addition polymer may comprise any suitable organic solvent or mixture of solvents.

Examples of free radical initiators are those which are soluble in the mixture of monomers such as azobisisobutyronitrile, azobis(alpha, gamma-methylvaleronitrile), tertiary-butyl perbenzoate, tertiary-butyl peracetate, benzoyl peroxide, ditertiary-butyl peroxide and tertiary amyl peroxy 2-ethylhexyl carbonate.

Optionally, a chain transfer agent which is soluble in the mixture of monomers such as alkyl mercaptans, for example, tertiary-dodecyl mercaptan; ketones such as methyl ethyl ketone, chlorohydrocarbons such as chloroform can be used. A chain transfer agent provides control over the molecular weight to give products having required viscosity for various coating applications.

To prepare the addition polymer, the solvent may be first heated to reflux and the mixture of polymerizable monomers containing the free radical initiator may be added slowly to the refluxing solvent. The reaction mixture is then held at polymerizing temperatures so as to reduce the free monomer content, such as to below 1.0 percent and usually below 0.5 percent, based on the total weight of the mixture of polymerizable monomers.

For use in the electrodepositable coating composition of the invention, the dispersants prepared as described above usually have a weight average molecular weight of about 5,000 to 500,000 g/mol, such as 10,000 to 100,000 g/mol, and 25,000 to 50,000 g/mol.

The dispersant may be present in the electrodepositable coating composition in amount of 2% to 35% by weight, such as 5% to 32% by weight, such as 8% to 30% by weight, such as 15% to 27% by weight, based on the total weight of the binder solids.

The electrodepositable binder may optionally further comprise a non-fluorinated organic film-forming polymer. The non-fluorinated organic film-forming polymer is different than the pH-dependent rheology modifier described herein. The non-fluorinated organic film-forming polymer may comprise polysaccharides, poly(meth)acrylates, polyethylene, polystyrene, polyvinyl alcohol, poly (methyl acrylate), poly (vinyl acetate), polyacrylonitrile, polyimide, polyurethane, polyvinyl butyral, polyvinyl pyrrolidone, styrene butadiene rubber, nitrile rubber, xanthan gum, copolymers thereof, or combinations thereof. Each of these organic film-forming polymers may be ionic and comprise an ionic film-forming resin.

The non-fluorinated organic film-forming polymer may be present, if at all, in an amount of 0% to 90% by weight, such as 20% to 60% by weight, such as 25% to 40% by weight, based on the total weight of the binder solids.

The non-fluorinated organic film-forming polymer may be present, if at all, in an amount of at least 0% to 9.9% by weight, such as 0.1% to 5% by weight, such as 0.2% to 2% by weight, such as 0.3% to 0.5% by weight, based on the total solids weight of the electrodepositable coating composition.

The electrodepositable coating composition may also be substantially free, essentially free, or completely free of any or all of the non-fluorinated organic film-forming polymer described herein.

As mentioned above, the binder may optionally further comprise a crosslinking agent. The crosslinking agent should be soluble or dispersible in the aqueous medium and be reactive with active hydrogen groups of the pH-dependent rheology modifier (if the pH-dependent rheology modifier comprises such groups) and/or any other resinous film-forming polymers comprising active hydrogen groups present (if present) in the composition. Non-limiting examples of suitable crosslinking agents include aminoplast resins, blocked polyisocyanates, carbodiimides, and polyepoxides.

Examples of aminoplast resins for use as a crosslinking agent are those which are formed by reacting a triazine such as melamine or benzoguanamine with formaldehyde. These reaction products contain reactive N-methylol groups. Usually, these reactive groups are etherified with methanol, ethanol, or butanol including mixtures thereof to moderate their reactivity. For the chemistry preparation and use of aminoplast resins, see "The Chemistry and Applications of Amino Crosslinking Agents or Aminoplast", Vol. V, Part II, page 21 ff., edited by Dr. Oldring; John Wiley & Sons/Cita Technology Limited, London, 1998. These resins are commercially available under the trademark MAPRENAL® such as MAPRENAL MF980 and under the trademark CYMEL® such as CYMEL 303 and CYMEL 1128, available from Cytec Industries.

Blocked polyisocyanate crosslinking agents are typically diisocyanates such as toluene diisocyanate, 1,6-hexamethylene diisocyanate and isophorone diisocyanate including isocyanato dimers and trimers thereof in which the isocyanate groups are reacted ("blocked") with a material such as epsilon-caprolactam and methylethyl ketoxime. At curing temperatures, the blocking agents unblock exposing isocyanate functionality that is reactive with the hydroxyl functionality associated with the (meth)acrylic polymer. Blocked polyisocyanate crosslinking agents are commercially available from Covestro as DESMODUR BL.

Carbodiimide crosslinking agents may be in monomeric or polymeric form, or a mixture thereof. Carbodiimide crosslinking agents refer to compounds having the following structure:

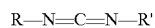

wherein R and R' may each individually comprise an aliphatic, aromatic, alkylaromatic, carboxylic, or heterocyclic group. Examples of commercially available carbodiimide crosslinking agents include, for example, those sold under the trade name CARBODILITE available from Nisshinbo Chemical Inc., such as CARBODILITE V-02-L2, CARBODILITE SV-02, CARBODILITE E-02, CARBODILITE SW-12G, CARBODILITE V-10 and CARBODILITE E-05.

Examples of polyepoxide crosslinking agents are epoxy-containing (meth)acrylic polymers such as those prepared from glycidyl methacrylate copolymerized with other vinyl monomers, polyglycidyl ethers of polyhydric phenols such as the diglycidyl ether of bisphenol A; and cycloaliphatic polyepoxides such as 3,4-epoxycyclohexylmethyl-3,4-epoxycyclohexane carboxylate and bis(3,4-epoxy-6-methylcyclohexyl-methyl) adipate.

The crosslinking agent may be present in the electrodepositable coating composition in amounts of 0% to 30% by weight, such as 5% to 20% by weight, such as 5% to 15% by weight, such as 7% to 12% by weight, the % by weight being based on the total weight of the binder solids.

The crosslinking agent may be present in the electrodepositable coating composition in amounts of 0% to 2% by weight, such as 0.1% to 1% by weight, such as 0.2% to 0.8% by weight, such as 0.3% to 0.5% by weight, the % by weight being based on the total solids weight of the electrodepositable coating composition.

Alternatively, the electrodepositable coating composition may be substantially free, essentially free or completely free of crosslinking agent. The electrodepositable coating composition is substantially free or essentially free of crosslinking agent if crosslinking agent is present, if at all, in an amount of less than 3% or less than 1%, respectively, based on the total weight of the binder solids.

The electrodepositable coating composition may optionally further comprise an adhesion promoter. The adhesion promoter may comprise an acid-functional polyolefin or a thermoplastic material.

The acid-functional polyolefin adhesion promoter may comprise an ethylene-(meth)acrylic acid copolymer, such as an ethylene-acrylic acid copolymer or an ethylene-methacrylic acid copolymer. The ethylene-acrylic acid copolymer may comprise constitutional units comprising10% to 50% by weight acrylic acid, such as 15% to 30% by weight, such as 17% to 25% by weight, such as about 20% by weight, based on the total weight of the ethylene-acrylic acid copolymer, and 50% to 90% by weight ethylene, such as 70% to 85% by weight, such as 75% to 83% by weight, such as about 80% by weight, based on the total weight of the ethylene-acrylic acid copolymer. A commercially available example of such an addition polymer includes PRIMACOR 5980i, available from the Dow Chemical Company.

The adhesion promoter may be present in the electrodepositable coating composition in an amount of 1% to 60% by weight, such as 10% to 40% by weight, such as 25% to 35% by weight, based on the total weight of the binder solids (including the adhesion promoter).

Alternatively, the electrodepositable coating composition may be substantially free, essentially free or completely free of adhesion promoter. The electrodepositable coating composition is substantially free or essentially free of adhesion promoter if adhesion promoter is present, if at all, in an amount of less than 1% or less than 0.1%, respectively, based on the total weight of the binder solids.

The electrodepositable coating composition may optionally comprise a catalyst to catalyze the reaction between the curing agent and the active hydrogen-containing resin(s). Suitable catalysts include, without limitation, organotin compounds (e.g., dibutyltin oxide and dioctyltin oxide) and salts thereof (e.g., dibutyltin diacetate); other metal oxides (e.g., oxides of cerium, zirconium and bismuth) and salts thereof (e.g., bismuth sulfamate and bismuth lactate). The catalyst may also comprise an organic compound such as a guanidine. For example, the guanidine may comprise a cyclic guanidine as described in U.S. Pat. No. 7,842,762 at col. 1, line 53 to col. 4, line 18 and col. 16, line 62 to col. 19, line 8, the cited portions of which being incorporated herein by reference. If present, the catalyst may be present in an amount of 0.01% to 5% by weight, such as 0.1% to 2% by weight, based on the total weight of the binder solids.

Alternatively, the electrodepositable coating composition may be substantially free, essentially free, or completely free of catalyst. The electrodepositable coating composition is substantially free or essentially free of catalyst if catalyst is present, if at all, in an amount of less than 0.01% or less than 0.001%, respectively, based on the total weight of the binder solids.

As used herein, the term "binder solids" may be used synonymously with "resin solids" and includes any film-forming polymer, such as those described above, and, if present, the curing agent. For example, the binder solids include, if present, the pH-dependent rheology modifier, the fluoropolymer, the dispersant, the adhesion promoter, the non-fluorinated organic film-forming polymer, catalyst, and the separately added crosslinking agent, as described above. The binder solids do not include the electrochemically active material and electrically conductive agent, if present. As used herein, the term "binder dispersion" refers to a dispersion of the binder solids in the aqueous medium.

The electrodepositable binder may comprise, consist essentially of, or consist of the ionic, film-forming resin in an amount of 10% to 100% by weight, such as 50% to 95% by weight, such as 70% to 93% by weight, such as 87% to 92% by weight; and the crosslinking agent, if present, in amounts of 0 to 30% by weight, such as 5% to 15% by weight, such as 8% to 13% by weight, the % by weight being based on the total weight of the binder solids.

The electrodepositable binder may comprise, consist essentially of, or consist of the pH-dependent rheology modifier in an amount of 10% to 100% by weight, such as 50% to 95% by weight, such as 70% to 93% by weight, such as 87% to 92% by weight; and the crosslinking agent, if present, in amounts of 0 to 30% by weight, such as 5% to 15% by weight, such as 7% to 13% by weight, the % by weight being based on the total weight of the binder solids.

The electrodepositable binder may comprise, consist essentially of, or consist of the pH-dependent rheology modifier in an amount of 10% to 100% by weight, such as 50% to 95% by weight, such as 70% to 93% by weight, such as 87% to 92% by weight; the fluoropolymer in an amount of 15% to 99% by weight, such as 30% to 96% by weight, such as 40% to 95% by weight, such as 50% to 90% by weight, such as 70% to 90% by weight, such as 80% to 90% by weight, such as 50% to 80% by weight, such as 50% to 70% by weight, such as 50% to 60% by weight; and the crosslinking agent, if present, in amounts of 0 to 30% by weight, such as 5% to 15% by weight, such as 7% to 13% by weight, the % by weight being based on the total weight of the binder solids.

The electrodepositable binder may comprise, consist essentially of, or consist of the pH-dependent rheology modifier in an amount of 10% to 100% by weight, such as 50% to 95% by weight, such as 70% to 93% by weight, such as 87% to 92% by weight; the fluoropolymer in an amount of 15% to 99% by weight, such as 30% to 96% by weight, such as 40% to 95% by weight, such as 50% to 90% by weight, such as 70% to 90% by weight, such as 80% to 90% by weight, such as 50% to 80% by weight, such as 50% to 70% by weight, such as 50% to 60% by weight; the dispersant in an amount of 2% to 35% by weight, such as 5% to 32% by weight, such as 8% to 30% by weight, such as 15% to 27% by weight; and the crosslinking agent, if present, in amounts of 0 to 30% by weight, such as 5% to 15% by weight, such as 7% to 13% by weight, the % by weight being based on the total weight of the binder solids.

The electrodepositable binder may comprise, consist essentially of, or consist of the pH-dependent rheology modifier in an amount of 10% to 100% by weight, such as 50% to 95% by weight, such as 70% to 93% by weight, such as 87% to 92% by weight; the fluoropolymer in an amount of 15% to 99% by weight, such as 30% to 96% by weight, such as 40% to 95% by weight, such as 50% to 90% by weight, such as 70% to 90% by weight, such as 80% to 90% by weight, such as 50% to 80% by weight, such as 50% to 70% by weight, such as 50% to 60% by weight; the dispersant in an amount of 2% to 35% by weight, such as 5% to 32% by weight, such as 8% to 30% by weight, such as 15% to 27% by weight; the adhesion promoter in an amount of 1% to 60% by weight, such as 10% to 40% by weight, such as 25% to 35% by weight; the non-fluorinated organic film-forming polymer, if present, in an amount of 0% to 90% by weight, such as 20% to 60% by weight, such as 25% to 40% by weight; and the crosslinking agent, if present, in amounts of 0 to 30% by weight, such as 5% to 15% by weight, such as 7% to 13% by weight, the % by weight being based on the total weight of the binder solids.

The electrodepositable binder may comprise, consist essentially of, or consist of the pH-dependent rheology modifier in an amount of 10% to 100% by weight, such as 50% to 95% by weight, such as 70% to 93% by weight, such as 87% to 92% by weight; the adhesion promoter, if present, in an amount of 1% to 60% by weight, such as 10% to 40% by weight, such as 25% to 35% by weight; the non-fluorinated organic film-forming polymer, if present, in an amount of 0% to 90% by weight, such as 20% to 60% by weight, such as 25% to 40% by weight; and the crosslinking agent, if present, in amounts of 0 to 30% by weight, such as 5% to 15% by weight, such as 7% to 13% by weight, the % by weight being based on the total weight of the binder solids.

The electrodepositable binder may be present in the electrodepositable coating composition in amounts of 0.1% to 20% by weight, such as 0.2% to 10% by weight, such as 0.3% to 8% percent by weight, such as 0.5% to 5% by weight, such as 1% to 3% by weight, such as 1.5% to 2.5% by weight, such as 1% to 2% by weight, based on the total solids weight of the electrodepositable coating composition.

The electrodepositable coating composition of the present invention may optionally further comprise an electrically conductive agent when the electrochemically active material comprises a material for use as an active material for a positive electrode. Non-limiting examples of electrically conductive agents include carbonaceous materials such as, activated carbon, carbon black such as acetylene black and furnace black, graphite, graphene, carbon nanotubes, carbon fibers, fullerene, and combinations thereof. It should be noted graphite may be used as both an electrochemically active material for negative electrodes as well as an electrically conductive agent, but an electrically conductive material is typically omitted when graphite is used as the electrochemically active material.

In addition to the material described above, the electrically conductive agent may comprise an active carbon having a high-surface area, such as, for example, a BET surface area of greater than 100 m$^2$/g. As used herein, the term "BET surface area" refers to a specific surface area determined by nitrogen adsorption according to the ASTM D 3663-78 standard based on the Brunauer-Emmett-Teller method described in the periodical "The Journal of the American Chemical Society", 60, 309 (1938). In some examples, the conductive carbon can have a BET surface area of 100 m$^2$/g to 1,000 m$^2$/g, such as 150 m$^2$/g to 600 m$^2$/g, such as 100 m$^2$/g to 400 m$^2$/g, such as 200 m$^2$/g to 400 m$^2$/g. In some examples, the conductive carbon can have a BET surface area of about 200 m$^2$/g. A suitable conductive carbon material is LITX 200 commercially available from Cabot Corporation.

The electrically conductive agent may optionally comprise a protective coating comprising the same coating materials as discussed above with respect to the electrochemically active material comprising a protective coating.

The electrically conductive agent may be present in the electrodepositable coating composition in amounts of 0.5% to 20% by weight, such as 1% to 20% by weight, such as 2% to 10% by weight, such as 2.5% to 7% by weight, such as 3% to 5% by weight, based on the total solids weight of the electrodepositable coating composition.

According to the present invention, the electrodepositable coating composition further comprises an aqueous medium comprising water. As used herein, the term "aqueous medium" refers to a liquid medium comprising more than 50% by weight water, based on the total weight of the aqueous medium. Such aqueous mediums may comprise less than 50% by weight organic solvent, or less than 40% by weight organic solvent, or less than 30% by weight organic solvent, or less than 20% by weight organic solvent, or less than 10% by weight organic solvent, or less than 5% by weight organic solvent, or less than 1% by weight organic solvent, less than 0.8% by weight organic solvent, or less than 0.1% by weight organic solvent, based on the total weight of the aqueous medium. Water comprises more than 50% by weight of the aqueous medium, such as at least 60% by weight, such as at least 70% by weight, such as at least 80% by weight, such as at least 85% by weight, such as at least 90% by weight, such as at least 95% by weight, such as at least 99% by weight, such as at least 99.9% by weight, such as 100% by weight, based on the total weight of the aqueous medium. Water may comprise 50.1% to 100% by weight, such as 70% to 100% by weight, such as 80% to 100% by weight, such as 85% to 100% by weight, such as 90% to 100% by weight, such as 95% to 100% by weight, such as 99% to 100% by weight, such as 99.9% to 100% by weight, based on the total weight of the aqueous medium. The aqueous medium may further comprise one or more organic solvent(s). Examples of suitable organic solvents include oxygenated organic solvents, such as monoalkyl ethers of ethylene glycol, diethylene glycol, propylene glycol, and dipropylene glycol which contain from 1 to 10 carbon atoms in the alkyl group, such as the monoethyl and monobutyl ethers of these glycols. Examples of other at least partially water-miscible solvents include alcohols such as ethanol, isopropanol, butanol and diacetone alcohol. The electrodepositable coating composition may in particular be provided in the form of a dispersion, such as an aqueous dispersion.

Organic solvent may be added to a waterborne formulation to modify viscosity within a desired range. The organic solvent added to the electrodepositable coating composition, or other waterborne formulation, may induce polymer swelling to achieve viscosity modification. The use of pH-dependent rheology modifiers described herein may allow for a reduction in the total amount of organic solvent required to meet desired viscosity targets to reduce the environmental impact of the compositions. Accordingly, use of the pH-dependent rheology modifier as described above in an electrodepositable coating composition may allow for production of electrodepositable coating compositions having a lower volatile organic content (VOC) than previously produced waterborne formulations. As used herein, the term "volatile organic content" or "VOC" refers to organic compounds having a boiling point of less than 250° C. As used herein, the term "boiling point" refers to the boiling point of a substance at standard atmospheric pressure of 101.325 kPa (1.01325 bar or 1 atm), also referred to as the normal boiling point. The volatile organic content includes volatile organic solvents. As used herein, the term "volatile organic solvent" refers to organic compounds having a boiling point of less than 250° C., such as less than 200° C. For example, the VOC of the electrodepositable coating composition of the present invention may be no more than 500 g/L, such as no more than 300 g/L, such as no more than 150 g/L, such as no more than 50 g/L, such as no more than 1 g/L, such as 0 g/L, and may range from 0 to 500 g/L, such as 0.1 to 300 g/L, such as 0.1 to 150 g/L, such as 0.1 to 50 g/L, such as 0.1 to 1 g/L. The VOC may be calculated according to the following formula:

$$VOC(g/L) = \frac{\text{total weight of } VOC \text{ (g)}}{\text{volume of total composition (L)} - \text{volume of water (L)}}$$

The organic solvent may be present, if at all, in an amount of less than 30% by weight, such as less than 20% by weight, such as less than 10% by weight, such as less than 5% by weight, such as less than 3% by weight, such as less than 1% by weight, such as less than 0.5% by weight, such as less than 0.3% by weight, such as less than 0.1% by weight, such as 0.0% by weight, based on the total weight of the electrodepositable coating composition.

Water is present in the aqueous medium such that the total amount of water present in the electrodepositable coating composition is at least 40% by weight, such as at least 45% by weight, such as at least 50% by weight, such as at least 55% by weight, such as at least 60% by weight, such as at least 65% by weight, such as at least 70% by weight, such as at least 75% by weight, such as at least 80% by weight, such as at least 85% by weight, such as at least 90% by weight, such as at least 95% by weight, based on the total weight of the electrodepositable coating composition. Water may be present in an amount of no more than 99% by weight, such as no more than 95% by weight, such as no more than 90% by weight, such as no more than 85% by weight, such as no more than 80% by weight, such as no more than 75% by weight, based on the total weight of the electrodepositable coating composition. Water may be present in an amount of 40% to 99% by weight, such as 45% to 99% by weight, such as 50% to 99% by weight, such as 60% to 99% by weight, such as 65% to 99% by weight, such as 70% to 99% by weight, such as 75% to 99% by weight, such as 80% to 99% by weight, such as 85% to 99% by weight, such as 90% to 99% by weight, such as 40% to 90% by weight, such as 45% to 85% by weight, such as 50% to 80% by weight, such as 60% to 75% by weight, based on the total weight of the electrodepositable coating composition.

The total solids content of the electrodepositable coating composition may be at least 0.1% by weight, such as at least 1% by weight, such as at least 3% by weight, such as at least 5% by weight, such as at least 7% by weight, such as at least 10% by weight, such as at least at least 20% by weight, such as at least 30% by weight, such as at least 40% by weight, based on the total weight of the electrodepositable coating composition. The total solids content may be no more than 60% by weight, such as no more than 50% by weight, such as no more than 40% by weight, such as no more than 30% by weight, such as no more than 25% by weight, such as no more than 20% by weight, such as no more than 15% by weight, such as no more than 12% by weight, such as no more than 10% by weight, such as no more than 7% by weight, such as no more than 5% by weight, based on the total weight of the electrodepositable coating composition. The total solids content of the electrodepositable coating composition may be 0.1% to 60% by weight, such as 0.1% to 50% by weight, such as 0.1% to 40% by weight, such as 0.1% to 30% by weight, such as 0.1% to 25% by weight, such as 0.1% to 20% by weight, such as 0.1% to 15% by weight, such as 0.1% to 12% by weight, such as 0.1% to 10% by weight, such as 0.1% to 7% by weight, such as 0.1% to 5% by weight, such as 0.1% to 1% by weight, such as 1% to 60% by weight, such as 1% to 50% by weight, such as 1% to 40% by weight, such as 1% to 30% by weight, such as 1% to 25% by weight, such as 1% to 20% by weight, such as 1% to 15% by weight, such as 1% to 12% by weight, such as 1% to 10% by weight, such as 1% to 7% by weight, such as 1% to 5% by weight based on the total weight of the electrodepositable coating composition.

The electrodepositable coating composition may be packaged in the form of a concentrate that is diluted with water and optionally organic solvent prior to use as an electrodepositable coating composition. Upon dilution, the electrodepositable coating composition should have a solids and water content as described herein.

The electrodepositable coating composition may comprise, consist essentially of, or consist of the electrochemically active material comprising a protective coating in an amount of 45% to 99% by weight, such as 70% to 98% by weight, such as 80% to 98% by weight, such as 90% to 98% by weight, such as 91% to 98% by weight, such as 91% to 95% by weight, such as 94% to 98% by weight, such as 95% to 98% by weight, such as 96% to 98% by weight; the electrodepositable binder in an amount of 0.1% to 20% by weight, such as 0.2% to 10% by weight, such as 0.3% to 8% percent by weight, such as 0.5% to 5% by weight, such as 1% to 3% by weight, such as 1.5% to 2.5% by weight, such as 1% to 2% by weight, based on the total solids weight of the electrodepositable coating composition; water in an amount of 40% to 99% by weight, such as 45% to 99% by weight, such as 50% to 99% by weight, such as 60% to 99% by weight, such as 65% to 99% by weight, such as 70% to 99% by weight, such as 75% to 99% by weight, such as 80% to 99% by weight, such as 85% to 99% by weight, such as 90% to 99% by weight, such as 40% to 90% by weight, such as 45% to 85% by weight, such as 50% to 80% by weight, such as 60% to 75% by weight, based on the total weight of the electrodepositable coating composition; and optionally the electrically conductive agent in an amount of 0.5% to 20% by weight, such as 1% to 20% by weight, such as 2% to 10% by weight, such as 2.5% to 7% by weight, such as 3% to 5% by weight, based on the total solids weight of the electrodepositable coating composition.

The pH of the electrodepositable coating composition will depend upon the type of electrodeposition in which the composition is to be used, as well as additives, such as pigments, fillers, and the like, included in the electrodepositable coating composition. The selection of electrochemically active material in particular can significantly impact the pH of the electrodepositable coating composition. For example, an anionic electrodepositable coating composition may have a pH from about 6 to about 12, such as about 6.5 to about 11, such as about 7 to about 10.5. In contrast, a cationic electrodepositable coating composition may have a pH from about 4.5 to about 10, such as about 4.5 to about 5.5, such as about 8 to about 9.5.

The electrodepositable coating composition may optionally further comprise a pH adjustment agent. The pH adjustment agent may comprise an acid or base. The acid may comprise, for example, phosphoric acid or carbonic acid. The base may comprise, for example, lithium hydroxide, lithium carbonate, or dimethylethanolamine (DMEA). Any suitable amount of pH adjustment agent needed to adjust the pH of the electrodepositable coating composition to the desired pH range may be used.

The present invention is also directed to methods for coating a substrate. The electrodepositable coating composition may be electrodeposited upon any electrically conductive substrate. Suitable substrates include metal substrates, metal alloy substrates, and/or substrates that have been metallized, such as nickel-plated plastic. Additionally, substrates may comprise non-metal conductive materials including composite materials such as, for example, materials comprising carbon fibers or conductive carbon. According to the present invention, the metal or metal alloy may comprise cold rolled steel, hot rolled steel, steel coated with zinc metal, zinc compounds, or zinc alloys, such as electrogalvanized steel, hot-dipped galvanized steel, galvanealed steel, and steel plated with zinc alloy. Aluminum alloys of the 1XXX, 2XXX, 3XXX, 4XXX, 5XXX, 6XXX, 7XXX or 8XXX series as well as clad aluminum alloys and cast aluminum alloys of the A356 series also may be used as the substrate. Magnesium alloys of the AZ31B, AZ91C, AM60B, or EV31A series also may be used as the substrate. The substrate used in the present invention may also comprise titanium and/or titanium alloys. Other suitable non-ferrous metals include copper and magnesium, as well as alloys of these materials. The substrate may be in the form of a current collector comprising a conductive material, and the conductive material may comprise a metal such as iron, copper, aluminum, nickel, and alloys thereof, as well as stainless steel. Other suitable conductive substrates include conductive carbon; a material coated with a conductive primer; a pre-made battery electrode for preparation of a multi-layered battery electrode; an electrically conductive porous polymer; and a porous polymer comprising a conductive composite. The substrate may also comprise an electrically insulating porous polymer wherein the substrate is coated using a conductive backing, such as, for example, by the method and with the apparatus disclosed in U.S. Pub. No. 2016/0317974 at paragraphs [0054] to [0058]. The substrate may also comprise a carbon-coated conductive material, such as a carbon-coated foil.

The method for coating a substrate may comprise electrodepositing an electrodepositable coating composition as described above to at least a portion of the substrate and at least partially curing the coating composition to form an at least partially cured coating on the substrate. According to the present invention, the method may comprise (a) electrodepositing onto at least a portion of the substrate an electrodepositable coating composition of the present invention and (b) heating the coated substrate to a temperature and for a time sufficient to cure the electrodeposited coating on the substrate.

In the methods of the present invention, a coating is applied onto or over at least a portion of the substrate via an electrodeposition process. In such a process, an electrically conductive substrate (such as any of those described earlier) serving as an electrode (such as an anode in anionic electrodeposition or a cathode in cathodic electrodeposition) in an electrical circuit comprising the electrode and a counter-electrode (such as a cathode in anionic electrodeposition or an anode in cathodic electrodeposition), are immersed in the electrodepositable coating composition of the present invention. An electric current is passed between the electrodes to cause the coating to deposit on the substrate. The applied voltage may be varied and can be, for example, as low as one volt to as high as several thousand volts but is often between 50 and 500 volts. The current density is often between 0.5 ampere and 15 amperes per square foot. The residence time of the substrate in the composition may be from 10 to 180 seconds.

After electrocoating, the substrate is removed from the bath and may be baked in an oven to dry and/or crosslink the electrodeposited coating film. For example, the coated substrate may be baked at temperatures of 400° C. or lower, such as 300° C. or lower, such as 275° C. or lower, such as 255° C. or lower, such as 225° C. or lower, such as 200° C. or lower, such as at least 50° C., such as at least 60° C., such as 50-400° C., such as 100-300° C., such as 150-280° C., such as 200-275° C., such as 225-270° C., such as 235-265° C., such as 240-260° C. The time of heating will depend somewhat on the temperature. Generally, higher temperatures require less time for curing. Typically, curing times are for at least 5 minutes, such as 5 to 60 minutes. The temperature and time should be sufficient such that the binder in the cured film is crosslinked (if applicable), that is, covalent bonds are formed between co-reactive groups on the film-forming resin and the crosslinking agent. The crosslinked electrodepositable binder may be substantially solvent resistant to the solvents of the electrolyte mentioned below. In other cases, after electrocoating and removal of the substrate from the bath the coated substrate may simply be allowed to dry under ambient conditions. As used herein, "ambient conditions" refers to atmospheric air having a relative humidity of 10 to 100 percent and a temperature in the range of −10 to 120° C., such as 5 to 80° C., such as 10 to 60° C. and, such as 15 to 40° C. Other methods of drying the coating film include microwave drying and infrared drying, and other methods of curing the coating film include e-beam curing and UV curing.

The present invention is also directed to an electrode comprising an electrical current collector and a film formed on the electrical current collector, wherein the film is deposited from the electrodepositable coating composition described above. The electrode may be a positive electrode or a negative electrode and may be manufactured by depositing the above-described electrodepositable coating composition to the surface of the current collector to form a coating film, and subsequently drying and/or curing the coating film.

The coating film of the electrode may comprise a cross-linked coating. As used herein, the term "cross-linked coating" refers to a coating wherein functional groups of the film-forming resin have reacted with functional groups of the crosslinking agent to form covalent bonds that cross-link the component molecules of the electrodepositable binder. The pH-dependent rheology modifier, adhesion promoter and non-fluorinated organic film-forming polymer, if present, may also have functional groups reactive with functional groups of the crosslinking agent and may also serve to cross-link the coating.

The current collector may comprise a conductive material, and the conductive material may comprise a metal such as iron, copper, aluminum, nickel, and alloys thereof, as well as stainless steel. For example, the current collector may comprise aluminum or copper in the form of a mesh, sheet or foil. Although the shape and thickness of the current collector are not particularly limited, the current collector may have a thickness of about 0.001 to 0.5 mm.

In addition, the current collector may be pretreated with a pretreatment composition prior to depositing the electrodepositable coating composition. As used herein, the term "pretreatment composition" refers to a composition that upon contact with the current collector, reacts with and chemically alters the current collector surface and binds to it to form a protective layer. The pretreatment composition may be a pretreatment composition comprising a group IIIB and/or IVB metal. As used herein, the term "group IIIB and/or IVB metal" refers to an element that is in group IIIB or group IVB of the CAS Periodic Table of the Elements as is shown, for example, in the Handbook of Chemistry and Physics, $63^{rd}$ edition (1983). Where applicable, the metal themselves may be used, however, a group IIIB and/or IVB metal compound may also be used. As used herein, the term "group IIIB and/or IVB metal compound" refers to compounds that include at least one element that is in group IIIB or group IVB of the CAS Periodic Table of the Elements. Suitable pretreatment compositions and methods for pretreating the current collector are described in U.S. Pat. No. 9,273,399 at col. 4, line 60 to col. 10, line 26, the cited portion of which is incorporated herein by reference. The pretreatment composition may be used to treat current collectors used to produce positive electrodes or negative electrodes.

To prepare an electrode for a lithium ion electrical storage device, an electrodepositable coating composition comprising the electrochemically active material, an electrically conductive agent, a fluoropolymer, a pH-dependent rheology modifier, and optional ingredients, is prepared by combining the ingredients to form the electrodepositable coating composition. These substances can be mixed together by agitation with a known means such as a stirrer, bead mill or high-pressure homogenizer. Exemplary methods for preparing such composition are presented in the examples below.

The thickness of the coating formed after electrodeposition may be at least 1 micron, such as 1 to 1,000 microns (μm), such as 10 to 500 μm, such as 50 to 250 μm, such as 75 to 200 μm.

The present invention is also directed to an electrical storage device. An electrical storage device according to the present invention may be manufactured by using one or more of the above electrodes prepared from the electrodepositable coating composition of the present invention. The electrical storage device comprises an electrode, a counter electrode and an electrolyte. The electrode, counter-electrode or both may comprise the electrode of the present invention, as long as one electrode is a positive electrode and one electrode is a negative electrode. Electrical storage devices according to the present invention include a cell, a battery, a battery pack, a secondary battery, a capacitor, a pseudocapacitor, and a supercapacitor.

The electrical storage device includes an electrolytic solution and can be manufactured by using parts such as a separator in accordance with a commonly used method. As a more specific manufacturing method, a negative electrode and a positive electrode are assembled together with a separator there between, the resulting assembly is rolled or bent in accordance with the shape of a battery and put into a battery container, an electrolytic solution is injected into the battery container, and the battery container is sealed up. The shape of the battery may be like a coin, button or sheet, cylindrical, square or flat.

The electrolytic solution may be liquid or gel, and an electrolytic solution which can serve effectively as a battery may be selected from among known electrolytic solutions which are used in electrical storage devices in accordance with the types of a negative electrode active material and a positive electrode active material. The electrolytic solution may be a solution containing an electrolyte dissolved in a suitable solvent. The electrolyte may be conventionally known lithium salt for lithium ion secondary batteries. Examples of the lithium salt include $LiClO_4$, $LiBF_4$, $LiPF_6$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $LiB(C_6H_5)_4$, $LiCF_3SO_3$, $LiCH_3SO_3$, $LiC_4F_9SO_3$, $Li(CF_3SO_2)_2N$, $LiB_4CH_3SO_3Li$ and $CF_3SO_3Li$. The solvent for dissolving the above electrolyte is not particularly limited and examples thereof include carbonate compounds such as propylene carbonate, ethylene carbonate, butylene carbonate, dimethyl carbonate, methyl ethyl carbonate and diethyl carbonate; lactone compounds such as y-butyl lactone; ether compounds such as trimethoxymethane, 1,2-dimethoxyethane, diethyl ether, 2-ethoxyethane, tetrahydrofuran and 2-methyltetrahydrofuran; and sulfoxide compounds such as dimethyl sulfoxide. The concentration of the electrolyte in the electrolytic solution may be 0.5 to 3.0 mole/L, such as 0.7 to 2.0 mole/L.

During discharge of a lithium ion electrical storage device, lithium ions may be released from the negative electrode and carry the current to the positive electrode. This process may include the process known as deintercalation. During charging, the lithium ions migrate from the electrochemically active material in the positive electrode to the negative electrode where they become embedded in the electrochemically active material present in the negative electrode. This process may include the process known as intercalation.

The electrodepositable coating composition may be substantially free, essentially free, or completely free of N-methyl-2-pyrrolidone (NMP). The electrodepositable coating composition may also be substantially free, essentially free, or completely free of further fugitive adhesion promoter. As used herein, the term "fugitive adhesion promoter" refers to N-methyl-2-pyrrolidone (NMP), dimethylformamide, N,N-dimethylacetamide, dimethylsulfoxide (DMSO), hexamethylphosphamide, dioxane, tetrahydrofuran, tetramethylurea, triethyl phosphate, trimethyl phosphate, dimethyl succinate, diethyl succinate and tetraethyl urea. As used herein, an electrodepositable coating composition substantially free of fugitive adhesion promoter includes less than 1% by weight fugitive adhesion promoter, if any at all, based on the total weight of the electrodepositable coating composition. As used herein, an electrodepositable coating composition essentially free of fugitive adhesion promoter includes less than 0.1% by weight fugitive adhesion promoter, if any at all, based on the total weight of the electrodepositable coating composition. When present, the fugitive adhesion promoter may be present in an amount of less than 2% by weight, such as less 1% by weight, such as less than 0.9% by weight, such as less than 0.1% by weight, such as less than 0.01% by weight, such as less than 0.001% by weight, based on the total weight of the electrodepositable coating composition.

According to the present invention, the electrodepositable coating composition may be substantially free, essentially free or completely free of fluoropolymer.

The electrodepositable coating composition may be substantially free, essentially free, or completely free of organic carbonate. As used herein, an electrodepositable composition is substantially free or essentially free of organic carbonate when organic carbonate is present, if at all, in an amount less than 1% by weight or less than 0.1% by weight, respectively, based on the total weight of the electrodepositable coating composition.

The electrodepositable coating composition may be substantially free, essentially free, or completely free of acrylic-modified fluoropolymer. As used herein, an electrodepositable composition is substantially free or essentially free of acrylic-modified fluoropolymer when acrylic-modified fluoropolymer is present, if at all, in an amount less than 1% by weight or less than 0.1% by weight, respectively, based on the total weight of the electrodepositable coating composition.

According to the present invention, the electrodepositable coating composition may be substantially free, essentially free or completely free of polyethylene, polytetrafluoroethylene, tetrafluoroethylene-hexafluoropropylene copolymer, and/or polyacrylonitrile derivatives.

The electrodepositable coating composition may be substantially free, essentially free, or completely free of organic carbonate. As used herein, an electrodepositable composition is substantially free or essentially free of organic carbonate when organic carbonate is present, if at all, in an amount less than 1% by weight or less than 0.1% by weight, respectively, based on the total weight of the electrodepositable coating composition.

The electrodepositable coating composition may be substantially free of acrylonitrile. As used herein, an electrodepositable composition is substantially free or essentially free of acrylonitrile when acrylonitrile is present, if at all, in an amount less than 1% by weight or less than 0.1% by weight, respectively, based on the total weight of the electrodepositable coating composition.

The electrodepositable coating composition may be substantially free of graphene oxide. As used herein, an electrodepositable composition is substantially free or essentially free of graphene oxide when graphene oxide is present, if at all, in an amount less than 5% by weight or less than 1% by weight, respectively, based on the total weight of the electrodepositable coating composition.

The pH-dependent rheology modifier may be substantially free, essentially free, or completely free of the residue of a carboxylic acid amide monomer unit. As used herein, a pH-dependent rheology modifier is substantially free or essentially free of carboxylic acid amide monomer units when carboxylic acid amide monomer units are present, if at all, in an amount less than 0.1% by weight or less than 0.01% by weight, respectively, based on the total weight of the pH-dependent rheology modifier.

The electrodepositable coating may be substantially free of isophorone. As used herein, an electrodepositable composition is substantially free or essentially free of isophorone when isophorone is present, if at all, in an amount less than 5% by weight or less than 1% by weight, respectively, based on the total weight of the electrodepositable coating composition.

The electrodepositable coating may be substantially free, essentially free, or completely free of a cellulose derivative. Non-limiting examples of cellulose derivatives includes carboxymethylcellulose and salts thereof (CMC). CMC is a cellulosic ether in which a portion of the hydroxyl groups on the anhydroglucose rings are substituted with carboxymethyl groups.

The electrodepositable coating may be substantially free, essentially free, or completely free of hydrazide compounds, including multi-functional hydrazide compounds. As used herein, an electrodepositable composition is substantially free or essentially free of hydrazide compounds when hydrazide compounds are present, if at all, in an amount less than 0.1% by weight or less than 0.01% by weight, respectively, based on the total binder solids weight of the electrodepositable coating composition.

The electrodepositable coating may be substantially free, essentially free, or completely free of styrene-butadiene rubber (SBR), acrylonitrile butadiene rubber or acrylic rubber. As used herein, an electrodepositable composition is substantially free or essentially free of styrene-butadiene rubber (SBR), acrylonitrile butadiene rubber or acrylic rubber when styrene-butadiene rubber (SBR), acrylonitrile butadiene rubber or acrylic rubber is present, if at all, in an amount less than 5% by weight or less than 1% by weight, respectively, based on the total binder solids weight of the electrodepositable coating composition.

The electrodepositable coating may be substantially free, essentially free, or completely free of poly(meth)acrylic acid having more than 70% by weight (meth)acrylic acid functional monomers, based on the total weight of the poly (meth)acrylic acid. As used herein, an electrodepositable composition is substantially free or essentially free of poly (meth)acrylic acid when poly(meth)acrylic acid is present, if at all, in an amount less than 5% by weight or less than 1% by weight, respectively, based on the total binder solids weight of the electrodepositable coating composition.

The electrodepositable coating composition may be substantially free, essentially free, or completely free of particulate polymers containing the residue of an aliphatic conjugated diene monomer unit and an aromatic vinyl monomer unit. As used herein, an electrodepositable composition is substantially free or essentially free of such particular polymers when the particular polymer is present, if at all, in an amount less than 5% by weight or less than 1% by weight, respectively, based on the total weight of the binder solids.

As used herein, the term "polymer" refers broadly to oligomers and both homopolymers and copolymers. The term "resin" is used interchangeably with "polymer".

The terms "acrylic" and "acrylate" are used interchangeably (unless to do so would alter the intended meaning) and include acrylic acids, anhydrides, and derivatives thereof, such as their $C_1$-$C_5$ alkyl esters, lower alkyl-substituted acrylic acids, e.g., $C_1$-$C_2$ substituted acrylic acids, such as methacrylic acid, 2-ethylacrylic acid, etc., and their $C_1$-$C_4$ alkyl esters, unless clearly indicated otherwise. The terms "(meth)acrylic" or "(meth)acrylate" are intended to cover both the acrylic/acrylate and methacrylic/methacrylate forms of the indicated material, e.g., a (meth)acrylate monomer. The term "(meth)acrylic polymer" refers to polymers prepared from one or more (meth)acrylic monomers.

As used herein molecular weights are determined by gel permeation chromatography using a polystyrene standard. Unless otherwise indicated molecular weights are on a weight average basis.

The term "glass transition temperature" is a theoretical value being the glass transition temperature as calculated by the method of Fox on the basis of monomer composition of the monomer charge according to T. G. Fox, Bull. Am. Phys. Soc. (Ser. II) 1, 123 (1956) and J. Brandrup, E. H. Immergut, Polymer Handbook $3^{rd}$ edition, John Wiley, New York, 1989.

As used herein, unless otherwise defined, the term substantially free means that the component is present, if at all, in an amount of less than 5% by weight, based on the total weight of the electrodepositable coating composition.

As used herein, unless otherwise defined, the term essentially free means that the component is present, if at all, in an amount of less than 1% by weight, based on the total weight of the electrodepositable coating composition.

As used herein, unless otherwise defined, the term completely free means that the component is not present in the electrodepositable coating composition, i.e., 0.00% by weight, based on the total weight of the electrodepositable coating composition.

As used herein, the term "total solids" refers to the non-volatile components of the electrodepositable coating composition of the present invention and specifically excludes the aqueous medium. The total solids explicitly include at least the binder solids, electrochemically active material comprising the protective coating, and, if present, the electrically conductive agent.

For purposes of the detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "a" fluoropolymer, "an" electrochemically active material, and "a" modifier with pH-dependent rheology, a combination (i.e., a plurality) of these components can be used. In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the surface. For example, an electrodepositable coating composition "deposited onto" a substrate does not preclude the presence of one or more other intervening coating layers of the same or different composition located between the electrodepositable coating composition and the substrate.

Whereas specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

Aspects

The following numbered clauses illustrate some aspects of the present invention:
1. An electrodepositable coating composition comprising:
    an electrochemically active material comprising a protective coating;
    an electrodepositable binder; and
    an aqueous medium.
2. The electrodepositable coating composition of Aspect 1, wherein the protective coating comprises a metal compound or complex.
3. The electrodepositable coating composition of Aspect 2, wherein the metal compound or complex comprises (i) a metal chalcogen; (ii) a metal pnictogen; (iii) a metal halide; (iv) a metal oxyhalide; (v) a metal oxynitride; (vi) a metal phosphate; (vi) a metal carbide; (vii) a metal oxycarbide; (viii) a metal carbonitride; (ix) an olivine; (x) a NaSICON structure; (xi) a polymetallic ionic structure; (xii) a metal organic structure or complex; (xiii) a polymetallic organic structure or complex; or (xiv) a metal carbon-based coating.
4. The electrodepositable coating composition of any one of the preceding Aspects, wherein the protective coating comprises a metal-oxide coating.
5. The electrodepositable coating composition of Aspect 4, wherein the metal-oxide of the metal-oxide coating comprises an oxide of titanium.
6. The electrodepositable coating composition of Aspect 5, wherein the oxide of titanium comprises titania.
7. The electrodepositable coating composition of any one of the Aspects 4 to 6, wherein the metal-oxide of the metal-oxide coating comprises an oxide of aluminum.
8. The electrodepositable coating composition of Aspect 7, wherein the oxide of aluminum comprises alumina.
9. The electrodepositable coating composition of any one of the preceding Aspects, wherein the protective coating comprises a carbon-based coating.
10. The electrodepositable coating composition of Aspect 9, wherein the carbon-based coating comprises a metal carbonate.
11. The electrodepositable coating composition of Aspect 10, wherein the carbon-based coating comprises lithium carbonate.

12. The electrodepositable coating composition of any one of the preceding Aspects, wherein the protective coating comprises a non-metal compound or complex.
13. The electrodepositable coating composition of Aspect 12, wherein the non-metal compound or complex comprises (i) a non-metal oxide; (ii) a non-metal nitride; (iii) a non-metal carbonitride; (iv) a non-metal fluoride; (v) a non-metallic organic structures or complexes; (vi) or a non-metal oxyfluoride.
14. The electrodepositable coating composition of any one of the preceding Aspects, wherein the electrochemically active material comprises a material capable of incorporating lithium, and the material capable of incorporating lithium comprises $LiCoO_2$, $LiNiO_2$, $LiFePO_4$, $LiCoPO_4$, $LiMnO_2$, $LiMn_2O_4$, $Li(NiMnCo)O_2$, $Li(NiCoAl)O_2$, carbon-coated $LiFePO_4$, or a combination thereof.
15. The electrodepositable coating composition of any one of Aspects 1 to 13, wherein the electrochemically active material comprises a material capable of lithium conversion, and the material capable of lithium conversion comprises sulfur, $LiO_2$, $FeF_2$ and $FeF_3$, Si, aluminum, tin, SnCo, $Fe_3O_4$, or combinations thereof.
16. The electrodepositable coating composition of any one of the preceding Aspects, wherein the electrodepositable binder comprises a fluoropolymer.
17. The electrodepositable coating composition of any one of the preceding Aspects, wherein the electrodepositable binder comprises a pH-dependent rheology modifier.
18. The electrodepositable coating composition of Aspect 17, wherein the pH-dependent rheology modifier comprises an alkali-swellable rheology modifier.
19. The electrodepositable coating composition of Aspect 17, wherein the pH-dependent rheology modifier comprises an acid-swellable rheology modifier.
20. The electrodepositable coating composition of any one of the preceding Aspects further comprising a dispersant.
21. The electrodepositable coating composition of any one of the preceding Aspects, wherein the electrodepositable binder comprises an ionic, film-forming resin.
22. The electrodepositable coating composition of Claim any one of the preceding Aspects, further comprising a curing agent.
23. A method of coating a substrate, the method comprising: electrophoretically depositing the electrodepositable coating composition of any one of the preceding Aspects onto a substrate.
24. A coated substrate comprising an electrical current collector and a coating formed on the at least a portion of the electrical current collector, wherein the coating is deposited from the electrodepositable coating composition of any one of Aspects 1 to 22.
25. The coated substrate of Aspect 24, wherein the electrical current collector comprises aluminum, copper, steel, stainless steel, nickel, conductive carbon, a conductive primer coating, or a porous polymer.
26. The coated substrate of Aspect 24 or 25, wherein the coated substrate comprises a positive electrode.
27. The coated substrate of Aspect 24 or 25, wherein the coated substrate comprises a negative electrode.
28. The coated substrate of any one of Aspects 24 to 27, wherein the electrical current collector is pretreated with a pretreatment composition.
29. An electrical storage device comprising:
    (a) an electrode comprising the coated substrate of any one of Aspects 24 to 28;
    (b) a counter-electrode, and
    (c) an electrolyte.
30. The electrical storage device of Aspect 29, wherein the electrical storage device comprises a cell, a battery pack, a secondary battery, a capacitor, a supercapacitor and/or a pseudocapacitor.

Illustrating the invention are the following examples, which, however, are not to be considered as limiting the invention to their details. Unless otherwise indicated, all parts and percentages in the following examples, as well as throughout the specification, are by weight.

EXAMPLES

Example 1: Preparation of Dispersant

To a four-neck round bottom flask equipped with a mechanical stir blade, thermocouple, and reflux condenser was added 493.2 grams of diacetone alcohol. The diacetone alcohol was heated to a set point of 122° C. under a nitrogen atmosphere. A monomer solution containing 290.4 grams of methyl methacrylate, 295 grams of ethylhexyl acrylate, 51.5 grams of butyl acrylate, 187.3 grams of N-vinyl pyrrolidone, and 112.4 grams of methacrylic acid was thoroughly mixed in a separate container. An initiator solution of 9.1 grams of tert-amyl peroctoate and 163.8 grams of diacetone alcohol was also prepared in a separate container. The initiator and monomer solutions were co-fed into the flask at the same time using addition funnels over 210 and 180 minutes, respectively. After the initiator and monomer feeds were complete, the monomer addition funnel was rinsed with 46.8 grams of diacetone alcohol and the initiator addition funnel was rinsed with 23 grams of diacetone alcohol. The resulting solution was held at 122° C. for 1 hour. Next 200 grams of diacetone alcohol was added to the reactor followed by a second initiator solution of 2.8 grams of tert-amyl peroctoate and 24.5 grams of diacetone alcohol which was added over 30 minutes. The solution was held at 122° C. for 60 minutes. Then a third initiator solution of 2.8 grams of tert-amyl peroctoate and 24.5 grams of diacetone alcohol was added over 30 minutes. The solution was then held at 122° C. for 60 minutes. After the 60-minute hold, the solution was cooled to less than 100° C. and poured into a suitable container. The total solids of the resin solution was measured to be 52.74% solids.

To a four-neck round bottom flask equipped with a mechanical stir blade, thermocouple, and reflux condenser was added 462 grams of resin solution as described above. The resin solution was heated to a set point of 100° C. under a nitrogen atmosphere. Next 32.8 grams of dimethyl ethanolamine was added over 10 min. After the addition, the solution was held at 100° C. for 15 min and then cooled to 70° C. Once the solution reached 70° C., 541.5 grams of warm (70° C.) deionized water was added over 60 minutes and was mixed for 15 minutes. After mixing, the resin dispersion was poured into a suitable container. The solids content of the resin dispersion was measured to be 22.9% solids. This composition was used as the dispersant in Example 2.

Solids contents of the compositions were determined by the following procedure: An aluminum weighing dish from Fisher Scientific, was weighed using an analytical balance. The weight of the empty dish was recorded to four decimal places. Approximately 0.5 g of the composition and 3.5 g of acetone was added to the pre-weighed dish. The weight of the dish and the dispersant solution was recorded to four decimal places. The dish containing the dispersant solution was placed into a laboratory oven, with the oven temperature set to 110° C. and dried for 1 hour. The pre-weighed dish with remaining solid material was weighed using an analytical balance. The weight of the dish with remaining solid material was recorded to four decimal places. The solids content was determined using the following equation: % solids=100×[(weight of the dish with remaining solids)−(weight of the empty dish)]/[(weight of the dish composition prior to heating)−(weight of the empty dish)].

Example 2: Preparation of Fluoropolymer and Dispersant Dispersion

In a plastic cup was placed 96.27 grams of water, 121.85 grams (27.8 g solids) of the dispersant from Example 1, and 0.16 grams of a de-foaming agent (DREWPLUS). The resultant mixture was stirred vigorously using a Cowles blade while maintaining a modest vortex. This mixing was continued while 64.85 grams of polyvinylidene difluoride powder (RZ-49, commercially available from Asambly Chemical) was added in small portions. Mixing was continued for an additional 45 minutes after all the polyvinylidene difluoride powder was added.

Examples 3-8: Preparation of Electrodepositable Coating Compositions Including Metal-Oxide Coated Active Particles and Positive Electrodes Produced by Electrodeposition Thereof Electrodepositable coating compositions were produced by combining the ingredients for each example as follows:

To a plastic cup was added 0.59 g of a dispersion of a pH-dependent rheology modifier (0.17 g solids, 0.6% by weight of total solids; ACRYSOL™ ASE-60 from DOW Chemical Co.), 2.89 g of the dispersion of PVDF and dispersant prepared in Example 2 (0.66 g fluoropolymer solids, 2.4% by weight of total solids; 0.28 g dispersant solids, 1.0% by weight of total solids), 1.69 g of ethanol, and 21.9 g of deionized water. This mixture was mixed in a centrifugal mixer at 2,000 RPMs for 5 minutes. Next, 25 g (90% by weight of the total solids) of a metal-oxide coated electrochemically active material of lithium nickel manganese cobalt oxide with a ratio of Ni:Mn:Co of 6:2:2 coated with either titania or alumina at one of three levels (with level 1 indicating the thinnest protective coating thickness, level 2 an intermediate protective coating thickness, and level 3 the thickest protective coating), as identified in Table 2 for each example, was added to the mixture, and the mixture was mixed in a centrifugal mixer at 2000 RPMs for 5 minutes (each of the metal-oxide coated electrochemically active materials are commercially available from Forge Nano). Next, 1.67 g (6% by weight of the total solids) of an electrically conductive material ("Super P" carbon black commercially available from Imerys) was added to the mixture, and the mixture was mixed in a centrifugal mixer at 2000 RPMs for 5 minutes. Finally, 1.0 g of Hexyl CELLOSOLVE™ glycol ether and 0.31 g of DOWANOL™ PnB glycol ether (each available from DOW Chemical Co.) was added to the mixture, and the mixture was mixed in a centrifugal mixer at 2000 RPMs for 5 minutes. The composition was diluted to 10% total solids by addition of deionized water under constant stirring using a magnetic stir bar at 800 RPMs. The pH of each fully formulated electrodepositable coating composition is reported in Table 2. After 30 minutes of stirring, anionic electrodeposition was performed for each composition. An 8 cm by 11 cm by 20 μm carbon-coated aluminum foil immersed 8 cm into the electrodepositable coating composition served as the anode to be coated with a separation of 2.7 cm from a 10 cm by 12 cm aluminum foil as a counter electrode (cathode) immersed 8 cm into the electrodepositable coating composition. The electrodepositable composition was stirred using a magnetic stirrer throughout the duration of the electrodeposition, and a 30V electrical potential was applied across the electrodes using a direct current rectifier for three different times durations for each composition. After deposition, the films were rinsed with deionized water. Depositions at durations of 10 s, 20 s, and 30 s were measured to determine a mass deposition rate of each electrodepositable coating composition as calculated by a linear fit to the measured deposited mass at each time. The mass deposition rate for each composition is included in Table 2.

TABLE 2

| | Example # | | | | | |
|---|---|---|---|---|---|---|
| | 3 | 4 | 5 | 6 | 7 | 8 |
| Electrode Active Material | Alumina-coated electrode active material, coating level 1 | Alumina-coated electrode active material, coating level 2 | Alumina-coated electrode active material, coating level 3 | Titania-coated electrode active material, coating level 1 | Titania-coated electrode active material, coating level 2 | Titania-coated electrode active material, coating level 3 |
| pH | 11.37 | 11.36 | 11.37 | 11.33 | 11.36 | 11.32 |
| Mass Deposition Rate (mg/cm$^2$/s) | 0.105 | 0.110 | 0.159 | 0.157 | 0.127 | 0.250 |

Comparative Example 9: Preparation of Comparative Electrodepositable Coating Composition and Positive Electrodes Produced by Electrodeposition Thereof A comparative electrodepositable coating composition was prepared using the same procedure and amounts of materials as in Examples 3-8, except that 25 g of an electrode active material of lithium nickel manganese cobalt oxide with a ratio of Ni:Mn:Co of 6:2:2 that did not include a metal-oxide coating on the electrochemically active material was used in place of the 25 g of metal-oxide coated electrochemically active material of Examples 3-8 (the uncoated electrode active material commercially available from Forge Nano). The pH of the final formulation was 11.41. The comparative electrodepositable coating composition was electrodeposited using the same procedure as Examples 3-8, and a mass deposition rate of 0.222 mg/cm$^2$/s was determined by the same method used in Examples 3-8.

Evaluation of Electrodes of Examples 3-9

Coin cells were fabricated from the positive electrodes prepared by electrodeposition for a duration of 10 seconds as described above for each example. The coated substrates of Examples 3-8 and Comparative Example 9 were baked at 245° C. for 10 minutes, and then substrates were pressed to 35% porosity after baking using a calendar press provided by Innovative Machine Corporation before use as a positive electrode in the coin cell. The positive electrodes were paired with a lithium metal negative electrode. A ceramic coated 20 μm thick Celgard separator was used as the separator. The electrolyte was comprised of 1.2 M LiPF$_6$ in a solvent mixture of ethylene carbonate ("EC") and ethyl methyl carbonate ("EMC") at a 3:1 ratio of EC:EMC. The coin cell was fabricated using 316 stainless steel casings and pairing the positive electrode having a 1 cm diameter with the negative electrode having a 1.5 cm diameter and 60 μL of electrolyte solution. Testing of the batteries was performed on an Arbin battery tester using a single formation step at 0.1 C followed by three cycles at each rate specified in Table 3 below. Battery cycling was characterized by cycling the batteries at 1 C after the rate study was completed, and the results are provided in Table 3 below.

TABLE 3

| Example | Capacity at 0.1 C (mAh/g) | Capacity at 0.2 C (mAh/g) | Capacity at 0.4 C (mAh/g) | Capacity at 0.8 C (mAh/g) | Capacity at 1.6 C (mAh/g) | Capacity at 1 C after 20 cycles (mAh/g) |
|---|---|---|---|---|---|---|
| 3 | 163 | 143 | 111 | 72 | 22 | 50 |
| 4 | 177 | 168 | 143 | 107 | 47 | 74 |
| 5 | 176 | 168 | 156 | 142 | 116 | 130 |
| 6 | 168 | 155 | 144 | 116 | 77 | 103 |
| 7 | 169 | 164 | 143 | 111 | 92 | 105 |
| 8 | 169 | 164 | 144 | 106 | 47 | 74 |
| 9 | 0.1 | 0.0 | 0.0 | 0.0 | 0.0 | 0.0 |

The examples demonstrate significant improvement in coin cell performance for electrodes produced by electrodeposition of electrodepositable coating compositions of the present invention (Examples 3-8) that comprise metal-oxide coated electrochemically active materials compared to similar electrodepositable coating compositions (Comparative Example 9) that do not use metal-oxide coated electrochemically active materials.

Example 10: Preparation of Electrodepositable Coating Composition Including Lithium Carbonate Coated Active Particles and Positive Electrodes Produced by Electrodeposition Thereof To plastic cup was added 1.602 g a dispersion of a pH-dependent rheology modifier (0.07 g of solids, 0.4% by weight total solids; ACRYSOL™ ASE-60 from DOW Chemical Co.), 13.203 g of water, 1.794 g of the dispersion of PVDF and dispersant prepared in Example 2 (0.41 g fluoropolymer solids, 2.5% by weight of total solids; 0.18 g dispersant solids, 1.1% by weight of total solids), and 1.021 g of ethanol. This mixture was mixed in a centrifugal mixer at 2,000 RPMS for 5 minutes. Next, 15 g (92% by weight of the total solids) of a lithium carbonate coated electrochemically active material of lithium nickel manganese cobalt oxide (NCM 111, #52, from Argonne National Lab) was added to the mixture, and the mixture was mixed in a centrifugal mixer at 2,000 RPMs for 5 minutes. Next, 0.652 g (4% by weight of the total solids) of an electrically conductive material ("Super P" carbon black commercially available from Imerys) was added to the mixture, and the mixture was mixed in a centrifugal mixer at 2000 RPMs for 5 minutes. Finally, 1.354 g of Hexyl CELLOSOLVE™ glycol ether and 0.423 g of DOWANOL™ PnB glycol ether (each available from DOW Chemical Co.) was added to the slurry and mixed in a centrifugal mixer at 2000 RPMs for 5 minutes. The composition was diluted to 10% total solids by addition of 160 g of deionized water under constant stirring using a magnetic stir bar at 800 RPMs. After 30 minutes of stirring, anionic electrodeposition was performed. A 4.2 cm by 8 cm carbon-coated aluminum foil immersed 3.1 cm into the electrodepositable coating composition served as the anode to be coated with a separation of 2 cm from a 7.5 cm by 9.5 cm aluminum foil as a counter electrode (cathode) immersed 6 cm into the electrodepositable coating composition. The electrodepositable composition was stirred using a magnetic stirrer throughout the duration of the electrodeposition, and a 100V electrical potential was applied across the electrodes using a direct current rectifier for 10 seconds, 20 seconds and 30 seconds. The film was removed from solution and left to dry without any post-treatment. Depositions after 10 s, 20 s and 30 s yielded a coating mass of 9.46 mg/cm$^2$, 15.90 mg/cm$^2$, and 22.27 mg/cm$^2$, respectively.

Comparative Example 11: Preparation of Comparative Electrodepositable Coating Composition and Positive Electrodes Produced by Electrodeposition Thereof A comparative electrodepositable coating composition was prepared using the same procedure and amounts of materials as in Example 10, except that 15 g of an of an electrochemically active material of lithium nickel manganese cobalt oxide (NCM 111) that did not include a protective coating on the electrochemically active material was used in place of the 15 g of carbonate coated electrochemically active material used in Example 10. The comparative electrodepositable coating composition was electrodeposited using the same procedure as Example 10. Depositions after 10 s, 20 s and 30 s yielded a coating mass of 9.60 mg/cm$^2$, 15.82 mg/cm$^2$, and 21.12 mg/cm$^2$.

Evaluation of Electrodes of Examples 10-11

Coin cells were fabricated from the positive electrodes prepared by electrodeposition for a duration of 10 seconds as described above for each example. The coated substrates of Example 10 and Comparative Example 11 were baked at 245° C. for 10 minutes, and then substrates were pressed to 35% porosity after baking using a calendar press provided by Innovative Machine Corporation before use as a positive electrode in the coin cell. The positive electrodes were paired with a lithium metal negative electrode. A ceramic coated 20 μm thick Celgard separator was used as the separator. The electrolyte was comprised of 1.2 M LiPF$_6$ in a solvent mixture of ethylene carbonate ("EC") and ethyl methyl carbonate ("EMC") at a 3:7 ratio of EC:EMC. The coin cell was fabricated using 316 stainless steel casings and pairing the positive electrode having a 1 cm diameter with the negative electrode having a 1.5 cm diameter and 60 μL of electrolyte solution. Testing of the batteries was performed on an Arbin battery tester using a single formation step at 0.1 C followed by three cycles at each rate specified in Table 4 below. Battery cycling was characterized by cycling the batteries at 1 C after the rate study was completed, and the results are provided in Table 4 below.

TABLE 4

| Example | Capacity at 0.1 C (mAh/g) | Capacity at 0.2 C (mAh/g) | Capacity at 0.4 C (mAh/g) | Capacity at 0.8 C (mAh/g) | Capacity at 1.0 C (mAh/g) | Capacity at 1.6 C (mAh/g) | Capacity at 1 C after 50 cycles (mAh/g) |
|---|---|---|---|---|---|---|---|
| 10 | 141 | 137 | 129 | 120 | 114 | 98 | 111 |
| 11 | 113 | 88 | 42 | 13 | 7 | 0.6 | 6 |

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

We claim:

1. An electrodepositable coating composition comprising:
   an electrochemically active particle at least partially coated with a protective coating, wherein the electrochemically active particle comprises a material for use as an active material for a positive electrode or a material for use as an active material for a negative electrode;
   an electrodepositable binder; and
   an aqueous medium.

2. The electrodepositable coating composition of claim 1, wherein the protective coating comprises a metal compound or complex.

3. The electrodepositable coating composition of claim 2, wherein the metal compound or complex comprises (i) a metal chalcogen; (ii) a metal pnictogen; (iii) a metal halide; (iv) a metal oxyhalide; (v) a metal oxynitride; (vi) a metal phosphate; (vi) a metal carbide; (vii) a metal oxycarbide; (viii) a metal carbonitride; (ix) an olivine; (x) a NaSICON structure; (xi) a polymetallic ionic structure; (xii) a metal organic structure or complex; (xiii) a polymetallic organic structure or complex; or (xiv) a metal carbon-based coating.

4. The electrodepositable coating composition of claim 1, wherein the protective coating comprises a metal-oxide coating.

5. The electrodepositable coating composition of claim 4, wherein the metal-oxide of the metal-oxide coating comprises an oxide of titanium.

6. The electrodepositable coating composition of claim 5, wherein the oxide of titanium comprises titania.

7. The electrodepositable coating composition of claim 4, wherein the metal-oxide of the metal-oxide coating comprises an oxide of aluminum.

8. The electrodepositable coating composition of claim 7, wherein the oxide of aluminum comprises alumina.

9. The electrodepositable coating composition of claim 1, wherein the protective coating comprises a carbon-based coating.

10. The electrodepositable coating composition of claim 9, wherein the carbon-based coating comprises a metal carbonate.

11. The electrodepositable coating composition of claim 10, wherein the carbon-based coating comprises lithium carbonate.

12. The electrodepositable coating composition of claim 1, wherein the protective coating comprises a non-metal compound or complex.

13. The electrodepositable coating composition of claim 12, wherein the non-metal compound or complex comprises (i) a non-metal oxide; (ii) a non-metal nitride; (iii) a non-metal carbonitride; (iv) a non-metal fluoride; (v) a non-metallic organic structures or complexes; (vi) or a non-metal oxyfluoride.

14. The electrodepositable coating composition of claim 1, wherein the electrochemically active particle comprises a material capable of incorporating lithium, and the material capable of incorporating lithium comprises LiCoO$_2$, LiNiO$_2$, LiFePO$_4$, LiCoPO$_4$, LiMnO$_2$, LiMn$_2$O$_4$, Li(NiMnCo)O$_2$, Li(NiCoAl)O$_2$, carbon-coated LiFePO$_4$, or a combination thereof.

15. The electrodepositable coating composition of claim 1, wherein the electrochemically active particle comprises a material capable of lithium conversion, and the material capable of lithium conversion comprises sulfur, LiO$_2$, FeF$_2$ and FeF$_3$, Si, aluminum, tin, SnCo, Fe$_3$O$_4$, or combinations thereof.

16. The electrodepositable coating composition of claim 1, wherein the electrodepositable binder comprises a fluoropolymer.

17. The electrodepositable coating composition of claim 1, wherein the electrodepositable binder comprises a pH-dependent rheology modifier.

18. The electrodepositable coating composition of claim 17, wherein the pH-dependent rheology modifier comprises an alkali-swellable rheology modifier.

19. The electrodepositable coating composition of claim 17, wherein the pH-dependent rheology modifier comprises an acid-swellable rheology modifier.

20. The electrodepositable coating composition of claim 16, wherein the electrodepositable binder further comprises a dispersant.

21. The electrodepositable coating composition of claim 1, wherein the electrodepositable binder comprises an ionic, film-forming resin.

22. The electrodepositable coating composition of claim 15, further comprising a curing agent.

23. A method of coating a substrate, the method comprising:
   electrophoretically depositing the electrodepositable coating composition of claim 1 onto a substrate.

24. A coated substrate comprising an electrical current collector and a coating formed on the at least a portion of the electrical current collector, wherein the coating is deposited from the electrodepositable coating composition of claim 1.

25. The coated substrate of claim 24, wherein the electrical current collector comprises aluminum, copper, steel, stainless steel, nickel, conductive carbon, a conductive primer coating, or an electrically conductive porous polymer.

26. The coated substrate of claim 24, wherein the coated substrate comprises a positive electrode.

27. The coated substrate of claim 24, wherein the coated substrate comprises a negative electrode.

28. The coated substrate of claim 24, wherein the electrical current collector is pretreated with a pretreatment composition.

29. An electrical storage device comprising:
   (a) an electrode comprising the coated substrate of claim 24;
   (b) a counter-electrode, and
   (c) an electrolyte.

30. The electrical storage device of claim 29, wherein the electrical storage device comprises a cell.

31. The electrical storage device of claim 29, wherein the electrical storage device comprises a battery pack.

32. The electrical storage device of claim 29, wherein the electrical storage device comprises a secondary battery.

33. The electrical storage device of claim 29, wherein the electrical storage device comprises a capacitor.

34. The electrical storage device of claim 29, wherein the electrical storage device comprises a supercapacitor.

35. The electrical storage device of claim 29, wherein the electrical storage device comprises a pseudocapacitor.

* * * * *